United States Patent [19]

Dinwiddie, Jr. et al.

[11] Patent Number: 5,245,322
[45] Date of Patent: Sep. 14, 1993

[54] BUS ARCHITECTURE FOR A MULTIMEDIA SYSTEM

[75] Inventors: John M. Dinwiddie, Jr., West Palm Beach; Bobby J. Freeman, Boynton Beach; Gustavo A. Suarez, Boca Raton; Bruce J. Wilkie, West Palm Beach, all of Fla.

[73] Assignee: International Business Machines Corporation, Armonk, N.Y.

[21] Appl. No.: 625,577

[22] Filed: Dec. 11, 1990

[51] Int. Cl.$^5$ ............................................. G09G 5/00
[52] U.S. Cl. .................................. 345/115; 395/154; 345/10
[58] Field of Search ............... 340/721, 722, 723, 750, 340/799, 701, 703; 395/153, 154

[56] References Cited

U.S. PATENT DOCUMENTS

| | | | |
|---|---|---|---|
| 4,439,760 | 3/1984 | Fleming | 340/750 |
| 4,471,348 | 9/1984 | London et al. | 340/722 |
| 4,498,098 | 2/1985 | Stell | 358/22 |
| 4,599,611 | 7/1986 | Bowker et al. | 340/721 |
| 4,604,743 | 8/1986 | Alexandru | 370/85 |
| 4,808,989 | 2/1989 | Tabata et al. | 340/703 |
| 4,876,600 | 10/1989 | Pietzsch et al. | 358/183 |
| 4,878,117 | 10/1989 | Ikehira et al. | 358/183 |
| 4,947,257 | 8/1990 | Fernandez et al. | 358/183 |
| 5,027,212 | 6/1991 | Marlton et al. | 340/703 |

OTHER PUBLICATIONS

Colley, Martin "Parallel-Architecture Windowing Display", Dept. of Computer Science, Univ. of Essex, Wivenhoe Park, Colchester, Essex, U.K. Dec. 1987.
Voorhies et al, "Virtual Graphics" Computer Graphics, vol. 22, No. 4, Aug. 1988.
Operating Systems Review (SIGOPS) vol. 24, No. 2, Apr. 1990, New York U.S. pp. 19–33, XP000140421—Andy Hopper 'Pandora—An Experimental System for Multimedia Applications' p. 21, line 34—p. 21, line 44; FIG. 2; p. 26, line 1—p. 31, line 33; FIGS. 4, 5.

Primary Examiner—Richard Hjerpe
Attorney, Agent, or Firm—Stephen A. Terrile

[57] ABSTRACT

An information handling apparatus for transferring and composing image signals for display. The apparatus includes a bus adapted to allow selective access for multiple independent image signals generated by respective independent image sources. The selective access enables composition of the independent image signals in response to control information; the composition enables real time display of a composed image signal.

16 Claims, 13 Drawing Sheets

BUS ARCHITECTURE FOR A MULTIMEDIA SYSTEM

CROSS-REFERENCE TO RELATED APPLICATIONS

This application is related to the commonly-assigned application of John M. Dinwiddie, Jr., Bobby J. Freeman, Gustavo A. Suarez and Bruce J. Wilkie titled Multimedia System; the commonly-assigned application of John M. Dinwiddie, Jr., Bobby J. Freeman, Gustavo A. Suarez and Bruce J. Wilkie titled Bus Interface Circuit for a Multimedia System; and, the commonly-assigned application of John M. Dinwiddie, Jr., Bobby J. Freeman, Gustavo A. Suarez and Bruce J. Wilkie titled Media Control Module for a Multimedia System.

BACKGROUND OF THE INVENTION

The present invention relates to multimedia computer systems.

Multimedia computer systems are information handling systems which combine the information handling characteristics of traditional computer systems with high quality video and audio presentations. The video presentation is provided by a video display device and the audio presentation is provided by an audio output device.

Multimedia computer systems include media sources which generate media signals. The media signals include audio signals, which are provided to the audio output device, and image signals, which are provided to the video display device. The image signals may include graphics signals, text signals, animation signals and full motion video signals. An image signal is converted to a video presentation by the display device, which receives the image signal and scans the image signal in a raster pattern across a screen of the display device. The speed with which the display device scans the image is called the sweep rate. The screen has a horizontal resolution and a vertical resolution which define display device screen coordinates. The presentation from one complete scan of the screen is called a frame. To provide a full motion video presentation, a display device generates multiple frames per second.

It is often desirable to concurrently display a plurality of different image signals, including full motion video signals, via a single video display device. The image signals may be concurrently displayed by the display device using a plurality of different methods.

Multiple image signals may be concurrently displayed using a multiple plane method. With the multiple plane method, a background signal which is rapidly changing (e.g., full motion video) is stored in a first memory (the background memory) to provide a background plane. A foreground signal which is relatively constant (e.g., text or graphics) is stored in a second memory (the foreground memory) to provide a foreground plane. The two planes are merged and a merged signal is provided to the display device.

Multiple image signals may be concurrently displayed using an overlay method. With the overlay method, a frame of a full motion video signal is provided to a memory such as a frame buffer which stores the full motion video frame as a background frame. An overlay image signal is then stored in a portion of the memory thereby over writing the full motion video signal that is stored in that portion of the memory. The entire frame is then read from the memory to provide an overlaid image signal to the display device.

Multiple image signals may be concurrently displayed using a color keying method. With the color keying method, a first image signal is provided to control logic as a background frame. A second image signal which includes portions having a designated color is provided to the control logic as a key frame. For normal color keying, the control logic provides the key frame to the display device unless the designated color is present, at which time the control logic provides the background frame. Bowker et al., U.S. Pat. No. 4,599,611, discloses a computer system which uses the color keying method. In Bowker et al., two image signals (a set containing text signals and a set containing graphics signals) are supplied to a switch which receives the image signals and provides an output to a video display device on a pixel by pixel basis based upon whether a predetermined color is present. Prior to being provided to the switch, the image signal is converted to RGB (Red/Green/Blue) format if not already so encoded.

Multiple image signals may be concurrently displayed using a window method. With the window method, a first image signal (e.g., a full motion video image signal) provides a background image plane which is stored in a memory such as a frame buffer. A second image signal (e.g., a text or graphics image signal) provides a second image plane which is stored in all but a portion of the memory. This portion is a void, i.e., a window, in which the background image plane remains. This windowed image signal is then provided to the display device.

A window is a rectangular area in which the background image signal is displayed. The window is defined by window coordinates which define the location and size of the window with respect to display device screen coordinates. Multiple windows are often concurrently presented on a single display device. During concurrent display, one window, usually the most visible window, is the active window.

It is known to display windows of non-full motion video image signals using a system in which a digital bus connects a plurality of window modules to a display controller. The display controller connects the display bus to a system display. Colley, Martin, "Parallel-Architecture Windowing Display" Department of Computer Science, University of Essex, Wivenhoe Park, Colchester, Essex, U.K. (1987) discloses such a system.

In Colley, the window modules are provided by dividing a display memory into physically separate window areas. Each image signal window is maintained in its entirety in a respective window module; the visibility of overlapping portions of the windows is determined via arbitration as the screen of the display device is updated. Each window module contains a window management unit which defines the size, position and arbitration priority of an associated window.

The display controller reads data in 8 or 16-bit words from the display memories via the display bus. The data are read from each display memory via the digital bus to allow the memory to adequately provide information for display. The information which is read from the different display memories is stored in a frame buffer. The frame buffer is read to provide an image signal to the display device.

SUMMARY OF THE INVENTION

It has been discovered that a plurality of image signals from image sources may be concurrently displayed in real time using a media bus which composes the image signals in real time.

The invention features an information handling apparatus for transferring and composing image signals for display. The apparatus includes a bus which allows selective access for multiple independent image signals generated by respective independent image sources. The selective access enables composition of the independent image signals in response to control information; the composition enables real time display of a composed image signal.

In preferred embodiments, the apparatus includes one or more of the following features: the composition includes generating the composed image signal on a point by point basis; each image signal represents a virtual screen of information; the bus includes a video channel which the independent image signals selectively access and a control channel over which the control information is transmitted; some of the image signals include analog image signals and the video channel provides a path for the analog image signals; the analog image signals are differential analog image signals and the path for the analog image signals is a differential path; each analog image signal includes color characteristic signals and the path for the analog image signals includes paths for the color characteristic signals; the color characteristic signals include red, green, and blue characteristic signals and the paths for the color characteristic signals include paths for the red, green and blue characteristic signals; the image signals include respective synchronization information and the video channel includes a path for the synchronization information; the synchronization information includes vertical synchronization information and horizontal synchronization information and the path for the synchronization information includes paths for the vertical synchronization information and the horizontal synchronization information; the image signals include respective color key match information and the video channel includes a path for the color key match information; the bus includes a second video channel which the image signals selectively access; the bus includes a digital video channel, some of the independent image signals are digital image signals, and the digital image signals selectively access the digital video channel of the bus in response to control information; the control information includes switch information which indicates when to switch from one image signal to another image signal; the switch information includes horizontal information and vertical information for each image signal; and, the control information includes priority information for each image signal.

DETAILED DESCRIPTION

Multimedia System

Figure 1:
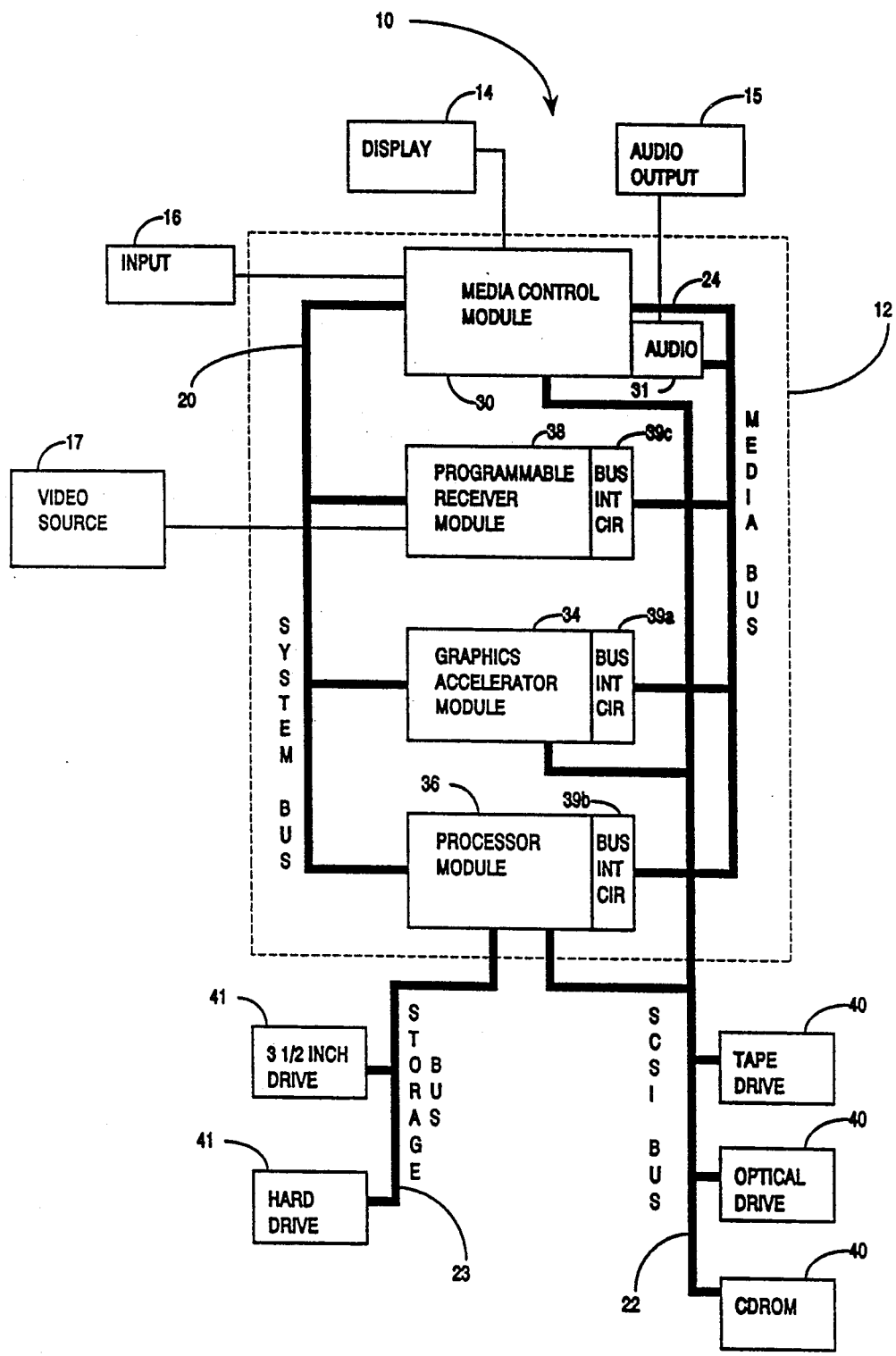
FIG. 1 is a block diagram of a multimedia system according to the present invention.

Referring to FIG. 1, multimedia system 10 includes multimedia core 12, display device 14, which may be for example an all points addressable (APA) video graphics array (VGA) or high definition television (HDTV) display device, audio output device 15, which may be for example speakers or headphones, input device 16, which may be for example a keyboard or a mouse, and analog full motion video source 17, which may be for example, a video tape player or a video disk player. Multimedia core 12 is arranged in modules; information is transferred among modules via system bus 20 and media bus 24. Information is provided to and received from multimedia core 12 via small computer system interface bus (SCSI) 22 and storage bus 23.

Multimedia core 12 includes media control module 30 and may include audio module 31, graphics accelerator module 34, processor module 36 and programmable receiver module 38. Modules 34, 36, and 38, which are media sources (i.e., devices which provide media signals), are each connected to media bus 24 via media bus interface circuits 39a, 39b, 39c, respectively. (Media bus interface circuits 39a, 39b, 39c are referred to generally as bus interface circuit 39.) Image signals from the media sources selectively access media bus 24 in response to control information; the selective access allows real time composition of the image signals. Audio signals from the media sources selectively access media bus 24 in response to control information; the selective access allows real time composition of the audio signals.

A composed image signal is provided from media bus 24 to display device 14 via media control module 30; a composed audio signal is provided to audio output device 15 via audio module 31. All input information from input device 16 is received via media control module 30. Programmable receiver 38 receives analog full motion video input information directly from video source 17; programmable receiver 38 may also receive electromagnetic transmissions from remote transmitters (e.g., television transmissions from television studios). The configuration of multimedia system 10 and of multimedia core 12 is meant to be representative; it is understood that the system and core configurations may be changed to satisfy a user's needs.

System bus 20 conforms to a conventional input/output bus architecture such as the IBM Micro Channel Architecture or the IBM Family I (i.e., IBM AT) bus architecture. System bus 20 is connected between modules which transfer input/output information such as media control module 30, graphics accelerator module 34, processor module 36 and programmable receiver module 38.

SCSI bus 22, which conforms to a conventional SCSI bus architecture, functions as a block transfer bus via which large blocks of information are transferred. SCSI bus 22 is connected directly to modules which require the transfer of large quantities of information such as processor module 36 and graphics accelerator module 34 as well as to SCSI devices 40 (e.g., a SCSI tape drive, a SCSI read/write optical disk device, or a SCSI CDROM reader). Because SCSI bus 22 is directly connected to modules which require transfers of large quantities of information, this information need not be transferred from SCSI bus 22 to modules which require the SCSI information via system bus 24. Accordingly, system bus 24 is free to perform other types of transfers.

Storage bus 23 conforms to a conventional storage bus architecture. Storage bus 23 is connected directly between devices 41 which store information (e.g., a 3½ inch disc drive, a hard drive or the like) and processor module 36.

Media bus 24 conforms to a media bus architecture which is described herein. Media bus 24 is connected between media control module 30, audio module 31 and media bus interface circuits 39 of media sources such as graphics accelerator module 34, processor module 36 and programmable receiver module 38.

By providing system bus 20, media bus 24 and SCSI bus 22, multimedia system 10 functions as a balanced system. Each bus optimally transfers the type of information for which it is designed. Accordingly, contention problems that arise when a bus must transfer information for which it is not designed are avoided.

Media core 12, and more specifically media bus 24, composes image signals in real time for display by display device 14. In other words, media core 12 combines image signals in parallel in real time on a point by point basis for display by display device 14. For the purposes of this application, "real time" is determined with reference to the sweep rate of display device 14, i.e., the speed with which information is presented by display device 14. Accordingly, the speed with which media bus 24 transmits information need only be as fast as the sweep rate of display device 14.

An image signal is provided by a media source to media bus 24 via a respective media bus interface circuit 39 on a point by point basis in response to control information. A point is related to the resolution of display device 14. Accordingly, if display device 14 is a 640 by 480 VGA monitor, a point corresponds to a coordinate of the VGA monitor. Alternately, if display device 14 is a 1920 by 1035 HDTV monitor, a point corresponds to a coordinate of the HDTV monitor.

A virtual screen implementation (i.e., every module assumes that it is providing an image signal to a display) is used by multimedia system 10 to achieve application transparency. A virtual screen implementation creates the appearance to each module of a dedicated display device. Thus, each media source which is generating an image signal generates that image signal whether or not the media source is granted access to media bus 24.

An image signal which is contained on media bus 24 is received by media control module 30 on a point by point basis and is provided to display device 14 on a point by point basis. The combination of the image signals from the media sources on media bus 24 provides a composed image signal which is provided to media control module 30. Media control module 30 adjusts the attributes (e.g., the voltage level) of the composed image signal to correspond to the attributes required by display device 14 and drives an adjusted composed image signal to display device 14. If no attribute adjustment were required, it is possible to provide the composed image signal directly to display device 14.

Figure 2:
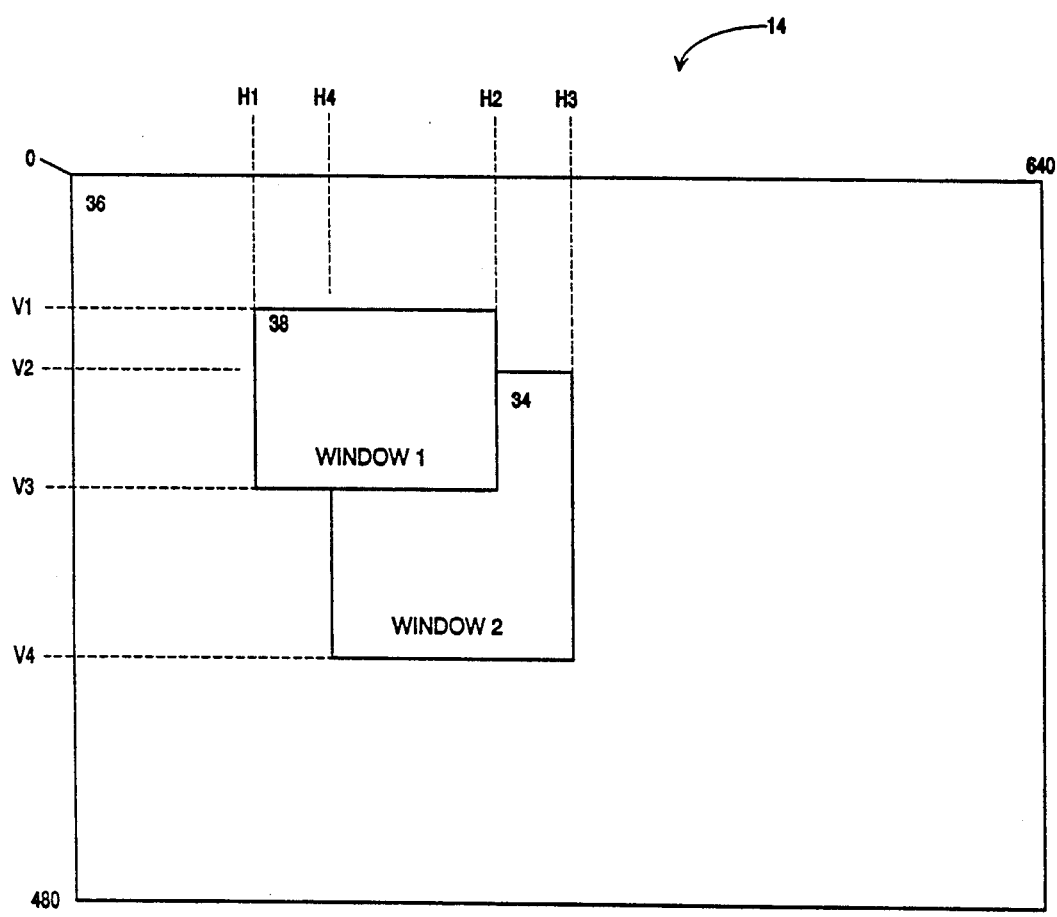
FIG. 2 is an example of a composed frame.

Referring to FIG. 2, an example of a composed frame is shown. For the purposes of this example, display device 14 is a VGA display device having a display resolution of 640 columns by 480 rows. The image signal which provides the background plane is provided by processor module 36. An image signal which is displayed in a first window (WINDOW 1) is provided by programmable receiver 38; this image signal is a full motion video signal. An image signal which is displayed in a second window (WINDOW 2) is provided by graphics accelerator module 34. It is understood that the example shown is merely meant to be illustrative of the invention.

The example shown is for one frame of display device 14. This frame is repeated multiple times per second thus allowing display device 14 to provide a full motion presentation. Accordingly, the following description of a composition of a frame is repeated multiple times per second.

During composition of the frame, bus interface circuits 39 allow selective access to media bus 24 of respective media sources in response to control information. In the preferred embodiment, the control information is provided by media control module 30. The control information which is provided to bus interface circuits 39 includes switching coordinate information as well as window priority information. This control information is provided when the frame is initially composed and is maintained within bus interface circuits 39 until the information for a particular module changes. I.e., multiple frames may be composed from the same switching coordinate information. If certain switching coordinate information is modified (e.g., because the display area of a particular module changes) then the modified switching coordinate information is provided to the appropriate bus interface circuit 39. This modified switching coordinate information is substituted within the appropriate bus interface circuit 39.

Synchronized media sources drive media bus 24 in real time. Image signals are received by media control module 30 in real time. Thus for sources which are synchronized, there is no need to store information within video memory before displaying the information via display device 14. Accordingly, the image signals that are contained on media bus 24 provide a composed image which is a single plane. Unsynchronized media sources provide image signals to media control module 30, which synchronizes these signals prior to display.

Composition of the frame shown in FIG. 2 is initiated by bus interface circuit 39b granting processor module 36 access to media bus 24 based upon the window priority and switching coordinate information. Processor module 36 provides an image signal to media bus 24 until display device 14 reaches coordinate H1,V1. At this location, bus interface circuit 39b rescinds the access grant to media bus 24 of processor module 36 and simultaneously, bus interface circuit 39c grants programmable receiver module 38 access to media bus 24.

Programmable receiver module 38 provides an image signal to media bus 24 until display device 14 reaches coordinate H2,V1, at which location bus interface circuit 39c rescinds the access grant to media bus 24 of programmable receiver module 38 and bus interface circuit 39b grants processor module 36 access to media bus 14. Access to media bus 24 continues to be interchanged between processor module 36 and programmable receiver module 38 at the horizontal coordinates H1 and H2 until display device 14 reaches coordinate H2,V2.

At coordinate H2,V2, bus interface circuit 39c rescinds the grant of access to media bus 24 of programmable receiver module 38 and bus interface circuit 39a grants graphics accelerator module 34 access to media bus 24. Graphics accelerator module 34 provides an image signal to media bus 24 until location H3,V3, at which location access to media bus 24 is switched to processor module 36 by bus interface circuits 39a, 39b, 39c. Access to media bus 24 continues to be exchanged between processor module 34, programmable receiver module 38, and graphics accelerator module 34 at the horizontal coordinates H1, H2 and H3 until display device 14 reaches coordinate H4,V3.

At coordinate H4,V3, programmable receiver 38 has completed its contribution to the composition of the screen to display device 14. Accordingly, for the remainder to the screen, programmable receiver 38 is no longer granted access to media bus 24.

At horizontal coordinates H3 and H4, access to media bus 24 is switched between processor module 36 and graphics accelerator module 34 until display device 14 reaches coordinate H3,V4. At coordinate H3,V4, access to media bus 24 is returned to processor module 36 for the remainder of the frame.

Media Bus Architecture

Media bus 24 serves as the pathway for media signals defined by the media bus architecture. The media bus architecture defines media signals for transfer of information between media sources and media control module 30. The media signals include image signals, control signals and audio signals. Accordingly, media bus 24 includes a plurality of video channels, a media control channel (MCC) and an audio channel. The video channels include a primary video channel (PVC), a secondary video channel (SVC), and a digital video channel (DVC).

The primary video channel is the channel via which image signals from the media sources are composed to provide a primary composed image signal to media control module 30. The primary channel includes paths for a primary analog image signal having red green and blue components (PVC RGB), a primary color key match (PVC CKM) signal, and a primary arbitration signal (PVC ARB). The PVC RGB signal is a differential analog RGB signal which is driven directly onto the primary channel by the media sources as an analog waveform under control of media control module 30. The PVC CKM signal controls video switch multiplexing in media control module 30; the PCKM signal is driven active low at pixel rates coincident with RGB data. The PVC ARB signal is a 4-bit one of sixteen priority arbitration signal.

The secondary video channel is the channel via which alternate or additional image signals from the media sources are composed to provide a secondary composed image signal to media control module 30. The secondary channel includes paths for a secondary analog image signal having red, green and blue components (SVC RGB), a secondary color key match (SVC CKM) signal, and a secondary arbitration signal (SVC ARB). The SVC RGB signal is a differential analog RGB signal which is driven directly onto the secondary channel by the media sources as an analog waveform under control of media control module 30. The SVC CKM signal controls video switch multiplexing in media control module 30; the SVC CKM signal is driven active low at pixel rates coincident with RGB data. The SVC ARB signal is a 4-bit one of sixteen priority arbitration signal.

The digital video channel is the channel via which digital video signals are transferred from a media source to media control module 30. The digital video channel is capable of supporting high-speed live video transfers as required by HDTV and other high resolution displays as well as transfers from other digital video sources. The digital video channel includes paths for a 32-bit image signal (DIG IM), a digital clock signal, a digital HSync signal and a digital VSync signal. The DIG IM signal includes an active high 8, 16, or 24-bit RGB signal, plus an 8-bit Alpha signal, which represents a degree of transparency. The digital clock signal is provided by media control module 30 to clock data either through media control module 30 to the media control module RGB output terminals or into a frame buffer of media control module 30. The maximum clock frequency of the digital video channel is 80 MHz, thus supporting HDTV data rates of 74.25 MHz.

The media control channel provides paths for media control information which controls the transfer of information over media bus 24. The media control channel allows media control module 30 to issue device-specific control information as well as to broadcast global control information to all media sources. The media control information includes window control block data which are written to each adapter as well as vital product data and personality data which are read from each adapter when system it is initialized. The media control channel also includes paths for a source synchronization signal (SOURCE SYNC) and a system synchronization signal (SYS SYNC) as well as a master clock signal (MASTER CLK). The media control channel also includes a path for a global reference signal (V BIAS) which is provided to all media sources which are connected to media bus 24.

The audio channel includes paths for a high fidelity digital audio signal (AUDIO) as well as a telephony grade digital (TEL AUDIO).

Media Control Module

Figure 3:
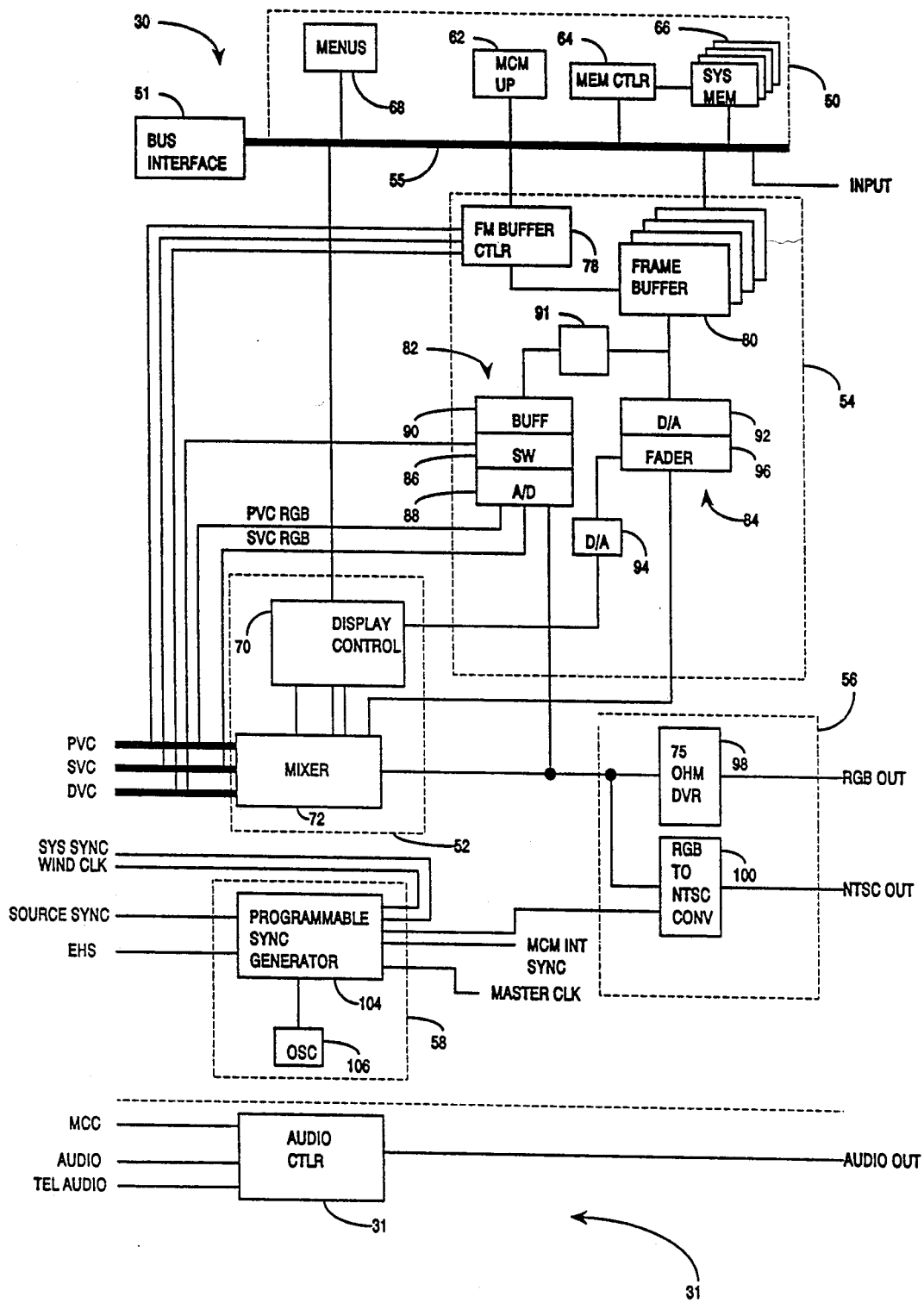
FIG. 3 is a block diagram of a media control module and an audio module of the FIG. 1 multimedia system.

Referring to FIGS. 1 and 3, media control module 30 provides a plurality of functions for media core 12. Media control module 30 controls composition on media bus 24. Media control module 30 also functions as a receiver and level converter for an image signal which is received from the primary video channel, the secondary video channel or the digital video channel. Media control module 30 also functions as a composition facility for image signals. Media control module 30 also functions as a video mixer for mixing image signals from the primary video channel, the secondary video channel and the digital video channel as well as image signals which are generated internally by media control module 30. Media control module 30 also functions as an image capture facility for storing images from a media source. Media control circuit 30 also functions as a display device driver circuit. Media control module 30 also functions as a synchronization signal generator for generating the synchronization signals for media core 12. Media control module 30 also functions as a composition facility for audio signals. Media control module 30 also provides, via input device 16, a direct user interface. Media control module 30 also interfaces with system bus 20 and SCSI bus 22. Some of the functions which media control module 30 performs occur continuously, other functions occur as needed. However, a plurality of functions can occur simultaneously.

Media control module 30 receives continuous data streams across the video channels of media bus 24 while controlling the media sources via the media control channel. Media control module 30 includes media control circuit 50, bus interface circuit 51, image signal processor circuit 52, and frame capture circuit 54, all of which are connected via media control module bus 55. Media control module 30 also includes display device adapter circuit 56, synchronization generator circuit 58.

When controlling composition of image signals on media bus 24, media control module 30 uses media control circuit 50. Media control circuit 50 includes media control module microprocessor 62, memory controller 64, media system memory 66, which is dynamic random access memory (DRAM), and menu memory 68, which is an electronically erasable programmable read only memory. Media system memory 66 holds a media control module operating system which controls the functions of media control module 30; memory 66 also contains I/O handling information for interfacing with input device 16. Menu memory 68 stores menu information which may be accessed via input device 16 (e.g., pull-down menus which are accessed via a pointing device such as a mouse). Media control module microprocessor 62 accesses media system memory 66 and menu memory 68 via memory controller 64. Memory controller 64 also controls access to any memory which may be resident on a particular bus interface circuit 39. E.g., if a new module is added to media core 12, media control module 30 requires media source personality data which are stored in the bus interface circuit 39 of the new module. The media source personality data are passed in a personality block via the media control channel 30 under control of memory controller 64. The personality data are used by media control module microprocessor 62.

Composition of a frame is initiated by a user defining composition characteristics via input device 16. The composition characteristics may include the desired size and shape of a window via which the image signal for a particular media source is to be displayed. Media control module microprocessor 62, in conjunction with the I/O handling information which is stored in media system memory 66, receives the user defined composition characteristics. Media control module microprocessor 62 then generates control information such as switching coordinate information and window priority information which is transmitted via the media control channel of media bus 24 to the media sources which are connected to media bus 24. The media sources are granted selective access to media bus 24 based upon this control information.

When functioning as a receiver and level converter or when functioning as a video mixer, media control module 30 uses image signal processor circuit 52. Image signal processor circuit 52 includes display controller 70 as well as mixer circuit 72. Display controller 70 functions as a interface circuit between frame capture circuit 54 and mixer circuit 72 because, by using frame capture circuit 54, media control module 30 may function as a source of an image signal. In addition to functioning as an interface between frame capture circuit 54 and mixer 72, display controller 70 also manages acquisition and display of images which are stored in frame capture circuit 52. Display controller 70 also manages other display functions such as background color flood in which the background presentation of display device 14 is set to a certain color. Display controller 70 also controls the fade level of selected frame buffer images (e.g., the menu image or a captured image) under control of media control module microprocessor 62.

When functioning only as a receiver and level converter, mixer circuit 72 of image signal processor circuit 52 receives either the PVC RGB signal, the SVC RGB signal or the DIG IM signal from media bus 24. Mixer circuit 72 levels the received image signal to provide a composed image signal (COMP RGB) which is has a constant base output level, e.g., a constant black level.

When functioning as a leveling circuit and a mixer circuit, mixer circuit 72 of image signal processor circuit 52 receives one or more of the PVC RGB and PVC CKM signals, the SVC RGB and SVC CKM signals, and the DIG IM signal from media bus 24, as well as a capture signal (MCM RGB) from frame capture circuit 54. Mixer circuit 72 mixes these signals under control of display controller 70 and levels the mixed signal to provide the COMP RGB signal.

When functioning as a composition facility, media control module 30 uses mixer circuit 72 in conjunction with media control circuit 50. During composition within media control module 30, mixer circuit 72 switches on a point by point basis between the PVC RGB, SVC RGB and DIG IM signals as well as a frame capture signal which is provided by frame capture circuit 54 to provide the COMP RGB signal. Display controller 70 controls the switching based upon information which is provided by media control circuit 50. Media control circuit 50 provides this information in response to user defined composition characteristics.

When functioning as an image capture facility, media control module 30 uses frame capture circuit 54. Frame capture circuit 54 includes frame buffer control circuit 78, frame buffer 80, which is video random access memory (VRAM), switch circuit 82 and fader circuit 84. Switch circuit 82 includes image switch 86, analog to digital (A/D) converter 88 and buffer circuit 90. Fader circuit 84 includes digital to analog converters 92, 94 and fader circuit 96. Frame capture circuit 54 receives the synchronization signals PVC SYNC, the SVC SYNC, the SYS SYNC. Frame capture circuit 54 also receives the PVC RGB signal, the SVC RGB signal and the DIG IM signal from media bus 24 and a composed image signal from image signal processor circuit 52 and selectively stores one of these signals in response to control information which is provided by media control module microprocessor 62 via media control bus 55 to capture a frame of information. When storing the frame capture signal, frame capture circuit is synchronized by the synchronization signal. Frame capture circuit 54 may provide to image signal processor circuit 52 the analog equivalent of the capture signal as the MCM RGB.

Frame capture circuit 54 is used to capture images, to receive image signals from non-genlocked (i.e., unsynchronized) sources and to provide menu information. Accordingly, frame buffer 80 includes both an image capture plane as well as a menu plane. The image capture plane is capable of storing four captured images. The menu capture plane is capable of storing menu information which is received from menu memory 68.

When capturing an image, image signals are selectively provided to frame buffer 80 via switch 86. The analog image signal is converted to an equivalent digital signal via analog to digital converter 88 prior to being provided to switch 86; the switched image is buffered via buffer 90. Buffer 90 is used to synchronize information which is provided to frame buffer 80 because the information may not be genlocked (i.e., synchronized) or may have timing skews due to composition or bus transmission. Image signals are provided to frame buffer 80 via serial ports. When writing to frame buffer 80, frame buffer 80 is synchronized with the source of the information. When reading from frame buffer 80, frame buffer 80 is synchronized with the SYS SYNC signal.

When presenting menu information, menu information which is stored in menu memory 68 is provided, via media control module bus 55, to a random access port of frame buffer 80 by media control module microprocessor 62. The menu information is stored in the menu plane of frame buffer 80. The menu information which is stored in the menu plane is then presented via mixer circuit 72.

When functioning as a display device driver, media control module 30 uses display device adapter circuit 56. Display device adapter circuit 56 includes 75 ohm driver circuit 98 and RGB to NTSC converter circuit 100. Display device adapter circuit 56 receives the composed image signal COMP RGB from image signal processor circuit 52 and the SYS SYNC signal from synchronization generator circuit 58. Display device adapter circuit 56 generates via 75 ohm driver circuit 98 an RGB signal (RGB OUT), which is capable of driving a VGA monitor Display device adapter circuit 56 generates via RGB to NTSC converter circuit 102 a composite NTSC signal (NTSC OUT), which is capable of driving a video monitor, video cassette recorder or other device which requires a direct composite baseband video input signal.

When functioning as a synchronization signal generator, media control module 30 uses synchronization generator circuit 58. Synchronization generator circuit 58 includes programmable sync generator 104 and oscillator 106. Synchronization generator circuit 58 receives the SOURCE SYNC signal, which is receive via media bus 24 from a media source as selected by media control module microprocessor 62, an external house synchronization signal (EHS), which may be externally provided to media control module 30, and an internal synchronization signal (INT SYNC) which is generated by oscillator 106 of synchronization generator circuit 58. The EHS signal may be a synchronization signal which includes separate horizontal and vertical components (EHS HSYNC, EHS VSYNC), a composite synchronization signal (i.e., a single signal which includes both horizontal and vertical components) or a black burst synchronization signal (i.e., a composite signal minus any video). Synchronization generator circuit 58 provides the SYS SYNC signal and the WIND CLK signal to the media control channel as well as a master clock signal (MASTER), which is the clock signal used internally by media control module 30, a blanking signal (BLANKING), a media control module synchronization signal (MCM SYNC), a display synchronization signal (DISP SYNC) and an NTSC composite synchronization signal (NTSC SYNC). The WIND CLK signal is provided to all media sources, thus allowing synchronous switching during composition. The MASTER signal is the clock signal used internally by media control module 30. The BLANKING signal, which includes a horizontal blanking signal (H BLANKING) and a vertical blanking signal (V BLANKING), controls when display device 14 is not illuminated such as during the retrace of a display device which scans an image signal. The MCM SYNC signal, which includes a horizontal component (MCM HSYNC) and a vertical component (MCM VSYNC), controls the display timing for media control module 30. The NTSC SYNC signal is the signal which is a synchronization signal which is compatible with the standard U.S. NTSC format. The DISP SYNC signal, which includes a horizontal component (DISP HSYNC) and a vertical component (DISP VSYNC), controls the horizontal and vertical synchronization pulses which VGA type display devices require.

When functioning as a direct user interface, input signals which are provided by input device 16 are received by media control module microprocessor 62 via media control module bus 55. These input signals may be used to generate menu presentations, in which case the input signals are used directly by media control module 30. These input signals may also be intended for another module such as processor module 36, in which case the input signals are received by media control module 30 and then provided to processor module 36 via system bus 20. When the input signals are intended for another module, media control module 30 still provides the necessary support to interpret the input signals before providing the input signals to the appropriate module.

When interfacing with system bus 20 and SCSI bus 22, media control channel 30 uses bus interface circuit 51. Bus interface circuit 51 also allows media control channel 30 to interface with the media control channel of media bus 24.

Figure 4:
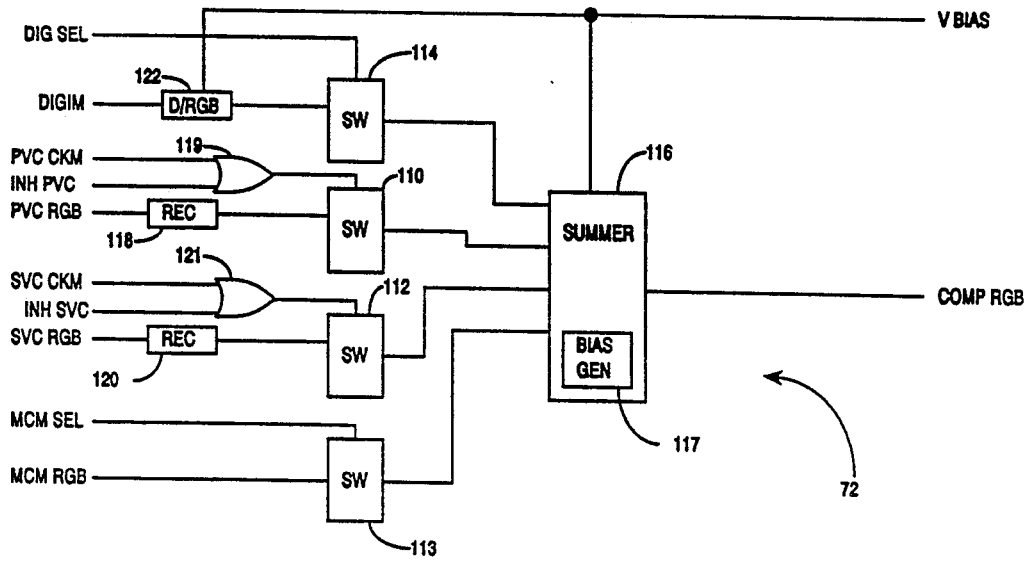
FIG. 4 is a block diagram of a video processor circuit of the media control module of FIG. 3.

Referring to FIG. 4, mixer circuit 72 uses switches 110, 112, 113, 114 to provide one or more of the PVC RGB signal, the SVC RGB signal, the MCM RGB signal and the RGB equivalent of the DIG IM image signal, respectively, to summer circuit 116. Switches 110, 112, are controlled by the INH PVC and INH SVC signals which are provided by display controller 70 and the PVC CKM and SVC CKM signals which are provided by respective media sources. Switches 113, 114 are controlled by the MCM SEL and DIG SEL signals which are provided by display controller 70. Summer circuit 116 receives the image signals provided by switches 110, 112, 113, 114 and generates the mixed, composed RGB image signal COMP RGB. Summer circuit 116 also includes a bias generator circuit 117 which generates the reference voltage V BIAS.

The PVC RGB signal, which is received from media bus 24 by primary receiver circuit 118, is provided to summer circuit 116 based upon the PVC CKM signal, which is received from media bus 24, and an inhibit primary video signal (INH PVC) signal, which is provided by display controller 70. Switch 110 provides the PVC RGB image signal to summer circuit 116 when both the PVC CKM signal and the INH PVC are inactive as determined by OR gate 119. OR gate 119 provides a select primary channel (PVC SEL) to switch 110. Accordingly, the PVC RGB signal is provided to summer circuit 116 unless the primary video channel is inhibited or a color key match corresponds to the PVC RGB signal for the particular coordinate.

The SVC RGB signal, which is received from media bus 24 by secondary receiver circuit 120, is provided to summer circuit 116 based upon the SVC CKM signal, which is received from media bus 24, and an inhibit secondary video signal (INH SVC), which is provided by display controller 70. Switch 112 provides the SVC RGB image signal to summer circuit 116 when both the SVC CKM signal and the INH PVC signal are inactive as determined by OR gate 121. OR gate 121 provides a select secondary channel (SVC SEL) to switch 112. Accordingly, the SVC RGB signal is provided to summer circuit 116 unless the secondary video channel is inhibited or a color key match corresponds to the SVC RGB signal for the particular coordinate.

Digital to RGB converter 122 provides a signal (DIG RGB), which is the leveled RGB equivalent of the DIG IM signal, to switch 114. Converter 122 receives the V BIAS signal, and adjusts the level of the DIG RGB signal appropriately. Switch 114 provides the DIG RGB signal to summer circuit 116 when the select digital image signal DIG SEL, which is provided by display controller 70, is active.

Switch 113 provides the MCM RGB signal to summer circuit 116 when the MCM SEL signal, which is provided by display controller 70, is active.

Figure 5A:
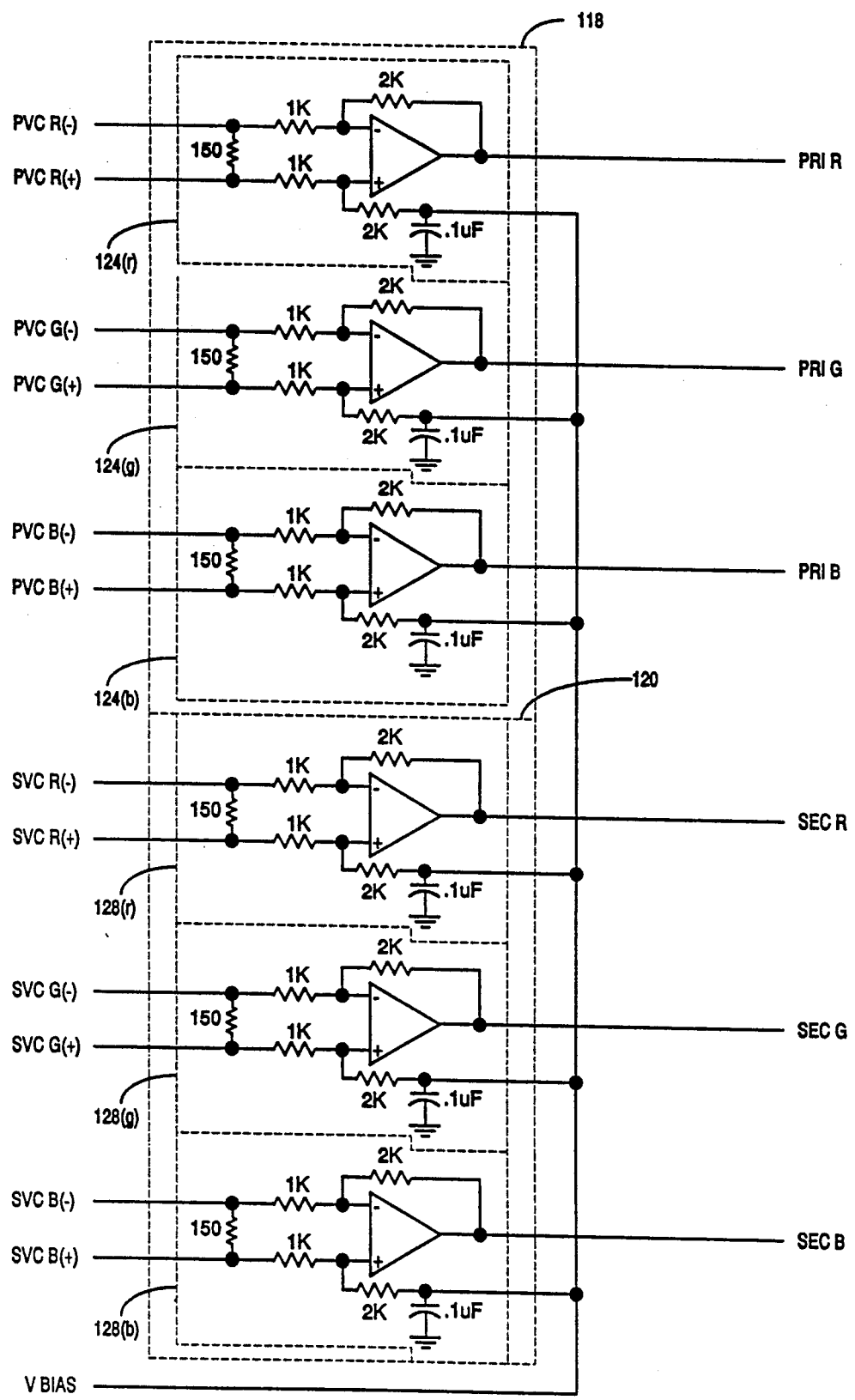
FIGS. 5A and 5B are a schematic diagram of the FIG. 4 video processor circuit.
Figure 5B:
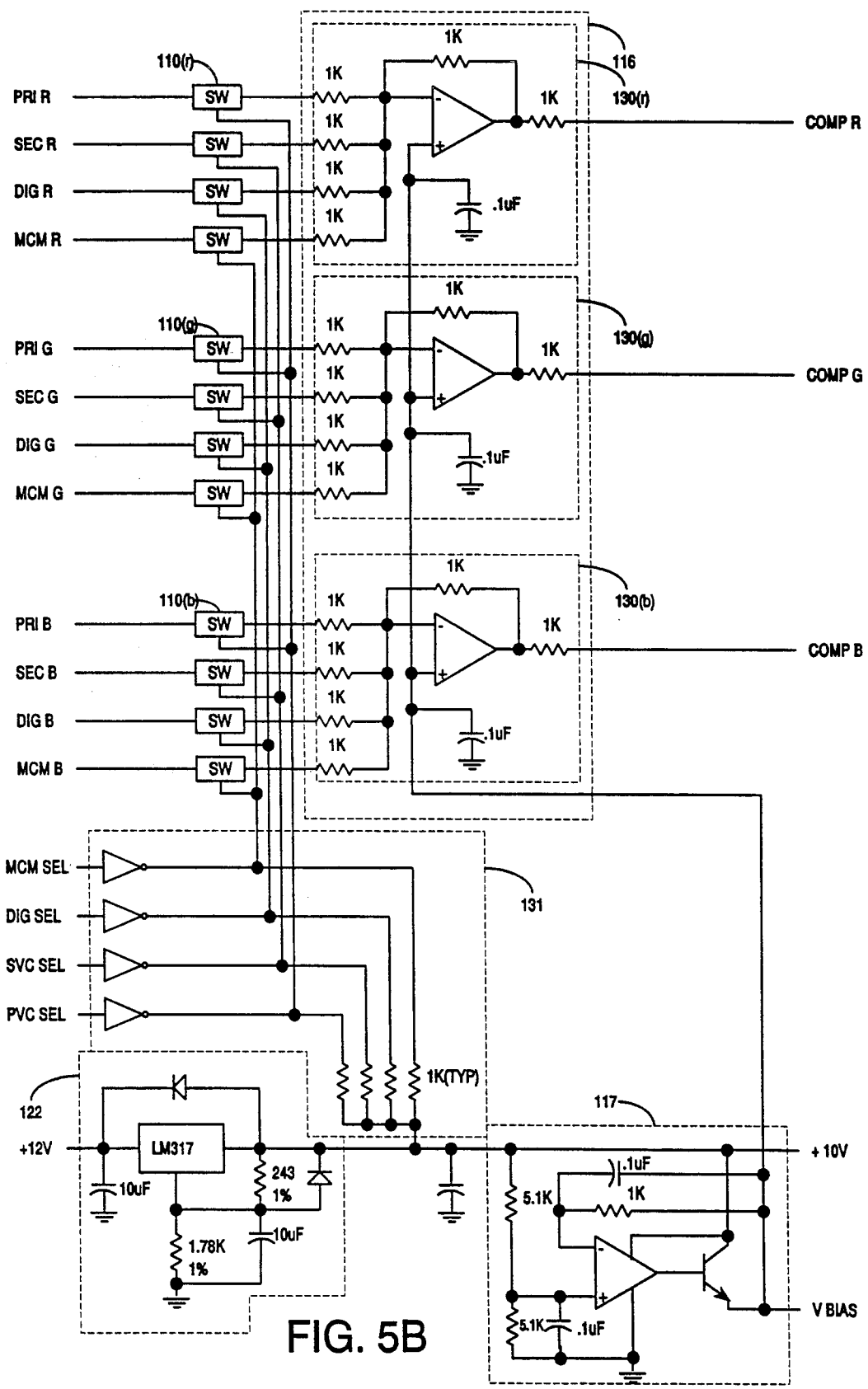

Referring to FIGS. 5A and 5B, mixer circuit 72 includes primary receiver circuit 118, secondary receiver circuit 120, switch circuits 110, 112, 113 and 114, summer circuit 116, as well as regulator circuit 122 and bias generator circuit 117.

Primary receiver circuit 118 includes three differential receiver circuits 124(r), 124(g), 124(b) (referred to generally as differential receiver circuit 124) which receive a respective component of the PVC RGB signal. Receiver circuit 124(r) receives the differential red component signal of the PVC RGB signal (PVC R) and provides a single ended primary red component signal (PRI R). Receiver circuit 124(g) receives the differential green component signal of the PVC RGB signal (PVC G) and provides a single ended primary green component signal (PRI G). Receiver circuit 124(b) receives the differential blue component signal of the PVC RGB signal (PVC B) and provides a single ended primary blue component signal (PRI B). Each receiver circuit 124(r), 124(g), 124(b) includes a high speed voltage mode operational amplifier (available under the trade designation HA-2540 from Harris, Inc.) which is configured to operate as a differential receiver. Each component receiver circuit 124 is provided with the V BIAS reference signal.

Secondary receiver circuit 120 includes three differential receiver circuits 128(r), 128(g), 128(b) (referred to generally as differential receiver circuit 128) which receive a respective component of the SVC RGB signal. Receiver circuit 128(r) receives the differential red component signal of the SVC RGB signal (SVC R) and provides a single ended secondary red component signal (SEC R). Receiver circuit 128(g) receives the differential green component signal of the SVC RGB signal (SVC G) and provides a single ended secondary green component signal (SEC G). Receiver circuit 128(b) receives the differential blue component signal of the SVC RGB signal (SVC B) and provides a single ended secondary blue component signal (SEC B). Each receiver circuit 128(r), 128(g), 128(b) includes a high speed voltage mode operational amplifier (available under the trade designation HA-2540 from Harris, Inc.) which is configured to operate as a differential receiver. Each component receiver circuit 128 is provided with the V BIAS reference signal.

Because each component receiver circuit 124, 128 receives the V BIAS reference signal, each component receiver provides an output signal which is level set based upon a system reference voltage. Accordingly, all of the component receiver output signals are based upon the same reference level.

Each switch circuit 110, 112, 113, 114 includes three component switches which correspond to the red, green and blue components of a respective signal. Each component switch allows selective access to summing amplifier circuit 130 of a component of the PRI RGB, SEC RGB, DIG RGB and MCM RGB signals. The component switches are high speed analog switches (available from Texas Instruments, Inc. under the trade designation TLC 4066I); each switch allows selective access to a component summing amplifier circuit 130.

Switches 110, 112, 113, 114 are enabled by select signals, PVC SEL, SEC SEL, DIG SEL, and MCM SEL, which are inverted and level translated by inverter circuit 131 prior to being provided to the switches.

Summer circuit 116 includes three component summing amplifier circuits 130(r), 130(g), 130(b) (referred to generally as component summing amplifier circuit 130). Red component summing amplifier circuit 130(r) receives the PRI R signal, the SEC R signal, the MCM R signal and the DIG R signal as red component input signals and provides the red component of the COMP RGB signal (COMP R), which is the sum of the red component input signals. Green component summing amplifier circuit 130(g) receives the PRI G signal, the SEC G signal, the MCM G signal and the DIG G signal as green component input signals and provides the green component of the COMP RGB signal (COMP G), which is the sum of the green component input signals. Blue component summing amplifier circuit 130(b) receives the PRI B signal, the SEC B signal, the MCM B signal and the DIG B signal as blue component input signals and provides the blue component of the COMP RGB signal (COMP B), which is the sum of the blue component input signals. Each component summing amplifier circuit 130 includes a high speed operational amplifier (available from Harris, Inc. under the trade designation HA-2540) which is configured as a unity gain summing amplifier. Each component summing amplifier circuit is provided with the V BIAS reference signal. Accordingly, each component summing amplifier circuit output signal is level set based upon the same system reference voltage.

Regulator circuit 122 includes a three terminal voltage adjustable voltage regulator (e.g., a LM 317 available from National Semiconductor, Inc.). The voltage regulator is biased by resistors to provide a regulated voltage of 10 volts. Regulator circuit 122 includes diodes which provide a shunt path to discharge the capacitors when power to system 10 is removed.

Bias generator circuit 117 divides the regulated voltage by half to provide the V BIAS reference signal which is a low-impedance reference voltage. The low impedance voltage decreases the susceptibility of the V BIAS signal to interference. Bias generator circuit 117 includes an operational amplifier which is configured as a low impedance voltage follower and a transistor which allows bias generator circuit 117 to provide current if necessary.

Figure 6:
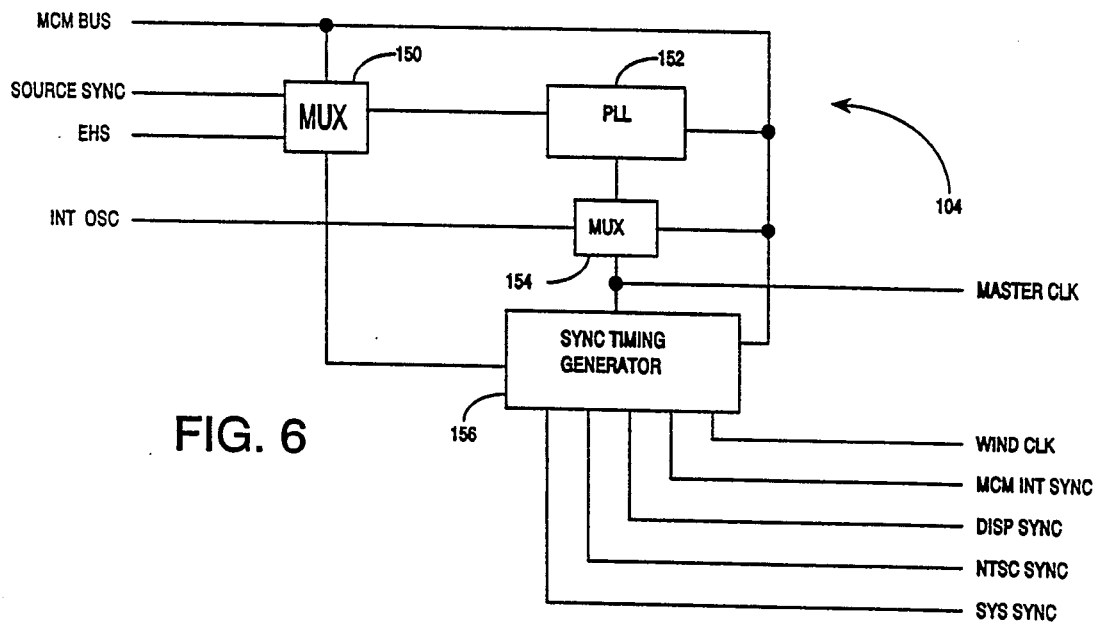
FIG. 6 is a block diagram of a synchronization circuit of the media control module of FIG. 3.

Referring to FIG. 6, programmable sync generator 104 includes input multiplexer 150, main phase lock loop 152, output multiplexer 154, and sync timing generator 156. Input multiplexer 150 receives the SOURCE SYNC signal and the EHS signal and provides a selected source synchronization signal (SEL SOURCE SYNC) signal to phase lock loop 152 and sync timing generator 156. Phase lock loop 152 receives the SEL SOURCE SYNC signal and provides a phase locked synchronization signal (SYNC CLK) to output multiplexer 154. Output multiplexer 154 receives the SYNC CLK signal and the INT SYNC signal and provides the MASTER CLK signal to sync timing generator 156. Sync timing generator 156 receives the MASTER CLK signal and the SEL SOURCE SYNC signal and provides the BLANKING signal, the MCM INT SYNC signal, the SYS SYNC signal, the NTSC COMP SYNC signal, the WIND CLK signal and the DISPLAY SYNC signal.

Figure 7A:
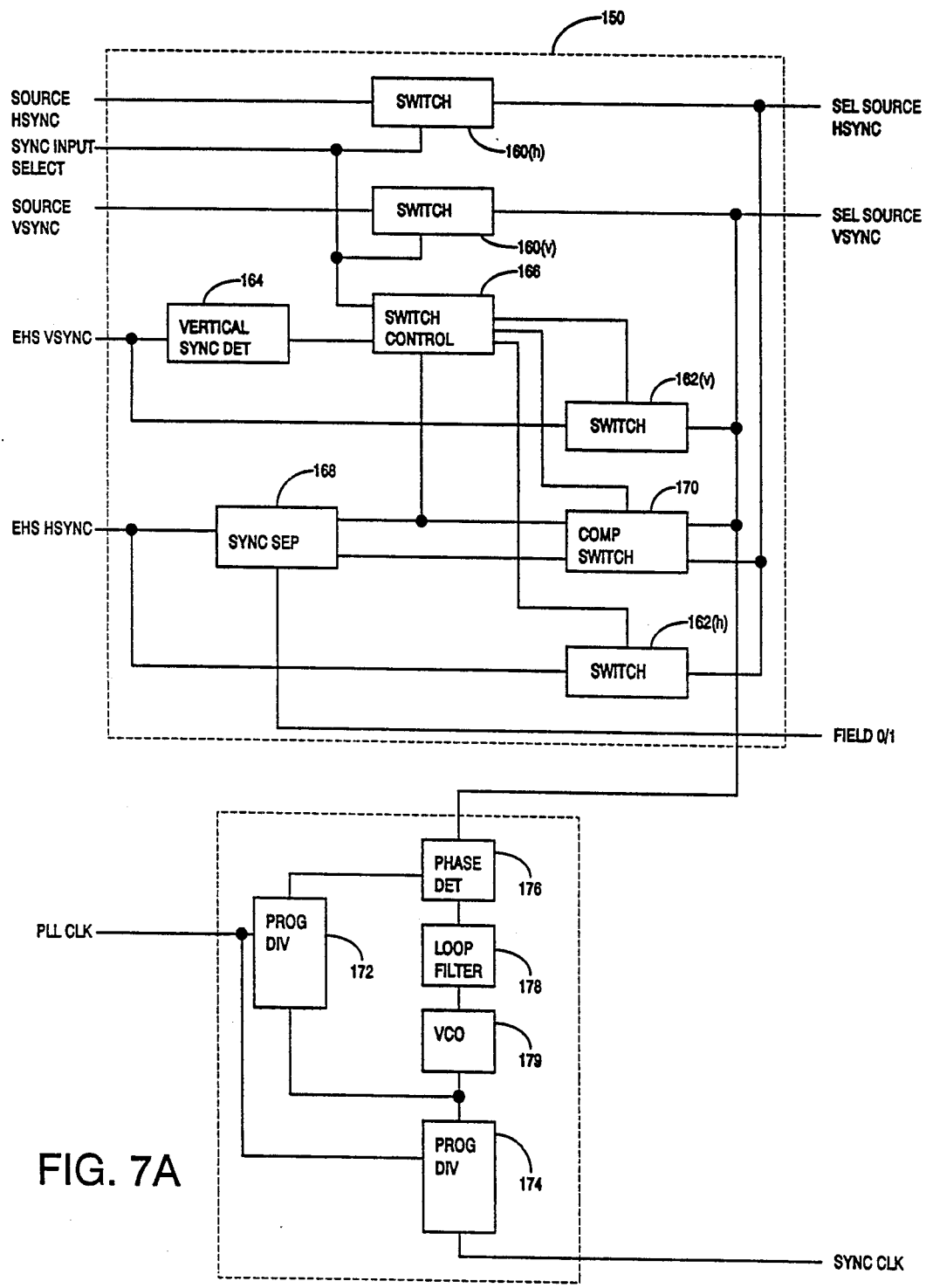
FIGS. 7A and 7B are a block diagram of the FIG. 6 synchronization circuit.
Figure 7B:
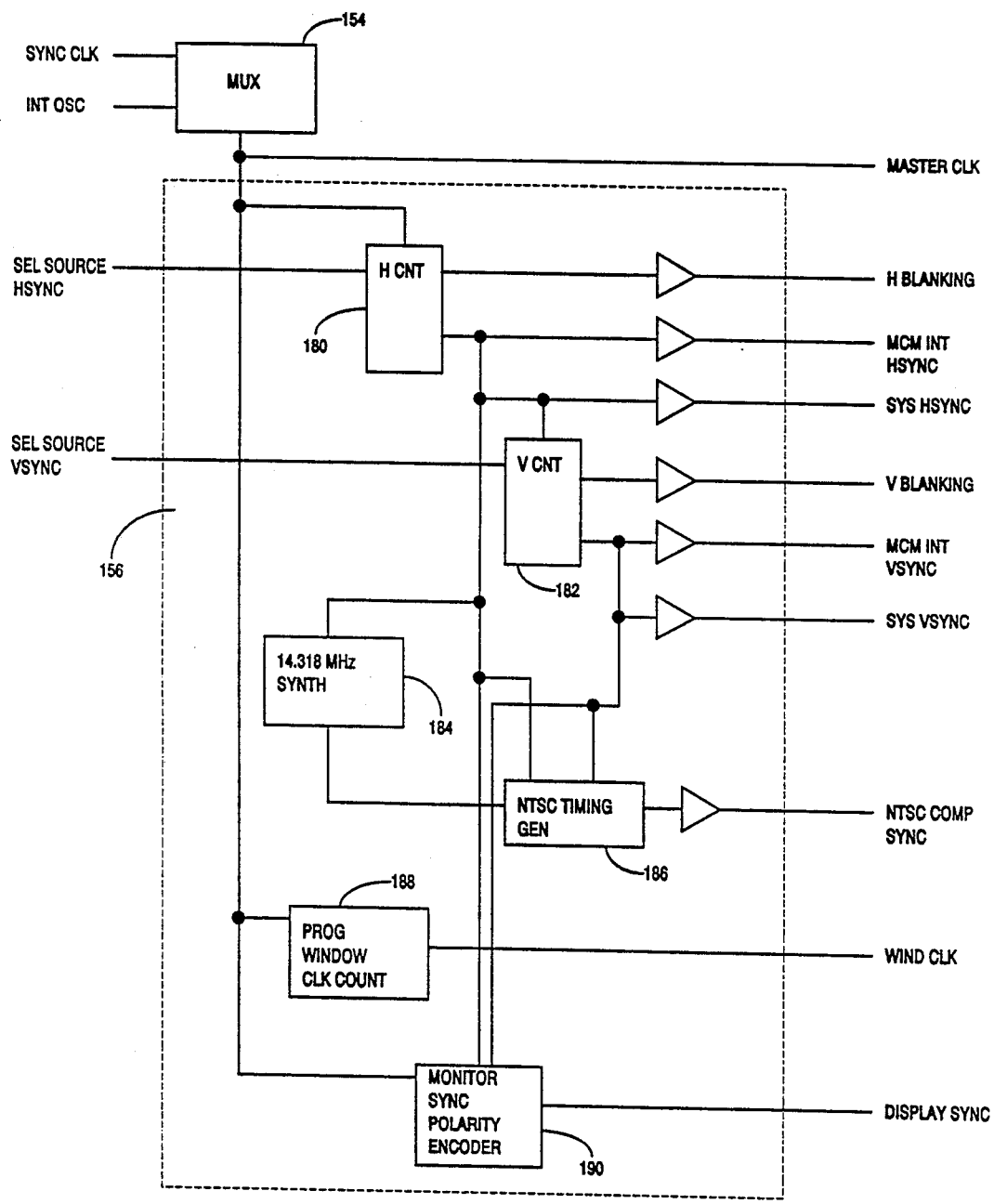

More specifically, referring the FIGS. 7A and 7B, input multiplexer 150 includes switches 160(h), 160(v) which receive the SOURCE HSYNC and SOURCE VSYNC signals, respectively. Switches 160(h), 160(v) are controlled via the SYNC INPUT SELECT signal which is provided by media control module microprocessor 62. Input multiplexer 150 also includes switches 162(h), 162(v) which receive the EHS HSYNC and EHS VSYNC signals, respectively. The EHS VSYNC signal is also provided to vertical synchronization signal detector circuit 164 which detects the presence of a vertical sync signal and provides a control input signal to switch control circuit 166 which also receives the SYNC INPUT SELECT signal. The EHS HSYNC signal path, via which the composite synchronization signal or the black burst synchronization signal is provided to multiplexer 150, is also connected to synchronization signal separator circuit 168. Synchronization signal separator circuit 168 separates the composite synchronization signal or the black burst synchronization signal into horizontal and vertical components. The horizontal and vertical components of the separated signal are provided to composite switch 170 which provides horizontal and vertical component output signals. The vertical component of the separated signal provided by separator circuit 168 is provided to switch control circuit 166. Switch control circuit 166 controls the activation of switches 162(h), 162(v) and composite switch 170 based upon the horizontal component of the separated signal, the control input signal provided by vertical synchronization signal detector 164 and the SYNC INPUT SELECT signal. The output signals of switches 160(h), 162(h) and the horizontal component of composite switch 170 are tied together to provide the SEL SOURCE HSYNC signal. The output signals of switches 160(v), 162(v) and the vertical component of composite switch 170 are tied together to provide the SEL SOURCE VSYNC signal. The SEL SOURCE HSYNC signal is provided to main phase lock loop 152.

Main phase lock loop 152 functions as a master system clock synthesizer. A phase lock loop control signal (PLL CNT) is provided via media control module bus 55 from media control module microprocessor 62 to programmable dividers 172, 174. Phase detector 176 receives the SEL SOURCE HSYNC signal and detects its phase. Loop filter 178 receives the output signal of phase detector 176 and determines acquisition and tracking filter characteristics of the phase lock loop. Voltage controlled oscillator 179 receives a DC voltage which is provided by loop filter 178 and provides a frequency based upon this voltage. Programmable dividers 172, 174 divide this frequency based upon the PLL CNT signal. Main phase lock loop 152 provides a master video timing clock (SYNC CLK). The SYNC CLK signal is the basis for all video pixel and display timings. The SYNC CLK signal is provided to output multiplexer 154.

Output multiplexer 154 provides an alternate fixed frequency master clock signal based upon either the SYNC CLK signal or the INT SYNC signal. More specifically, media control module microprocessor 62 instructs output multiplexer 154 to select the SYNC CLK signal for the timing source for system 10 unless a video source is not selected to provide a synchronization signal and an external synchronization signal is unavailable. For this condition, media control module 30 instructs multiplexer 154 to select the INT SYNC signal as the timing source for the system. This condition may exist when system 10 is first activated and thus no source has been yet chosen. In this case, the INT SYNC signal provides a timing reference so that the menus which are generated by media control module 30 may be displayed. The MASTER CLK signal is provided to programmable video synchronization generator 156.

Programmable video sync generator 156 includes horizontal counter circuit 180 and vertical counter circuit 182 which are programmed by media control module microprocessor 62 to provide the horizontal and vertical components of the timing signals which support the display device in use. These timing signals are used by display device 14 and as well as display device adapter circuit 56 of media control module 30.

Programmable video sync generator 156 also includes 14.318 MHz synthesizer 184 which provides a signal which clocks NTSC timing generator 186. Synthesizer 184 uses a phase lock loop to derive this signal based upon the SYS HSYNC signal so that when system 10 is operating in a genlocked mode, the NTSC COMP SYNC output signal is synchronized with the media source synchronization signal. If, however, system 10 is synchronized with the INT SYNC signal, the NTSC COMP SYNC signal is synchronized with the internal synchronization signal. In either case, the NTSC COMP SYNC signal is synchronized with the signal which synchronizes system 10.

Programmable video sync generator 156 also includes programmable window clock circuit 188 which provides the WIND CLK signal. The WIND CLK signal is used by all of the media sources to synchronize their respective windowing circuits. The frequency of the WIND CLK signal is programmed by media control module microprocessor 62 based upon the resolution requirements of any application software which is being used by the media sources.

Programmable video sync generator 156 also includes monitor sync polarity encoder 190 which a provides the DISPLAY SYNC signal based upon the SYS SYNC signal. The DISP HSYNC and DISP VSYNC signals include horizontal and vertical synchronization pulses which are used by standard VGA type display devices.

Bus Interface Circuit

Figure 8:
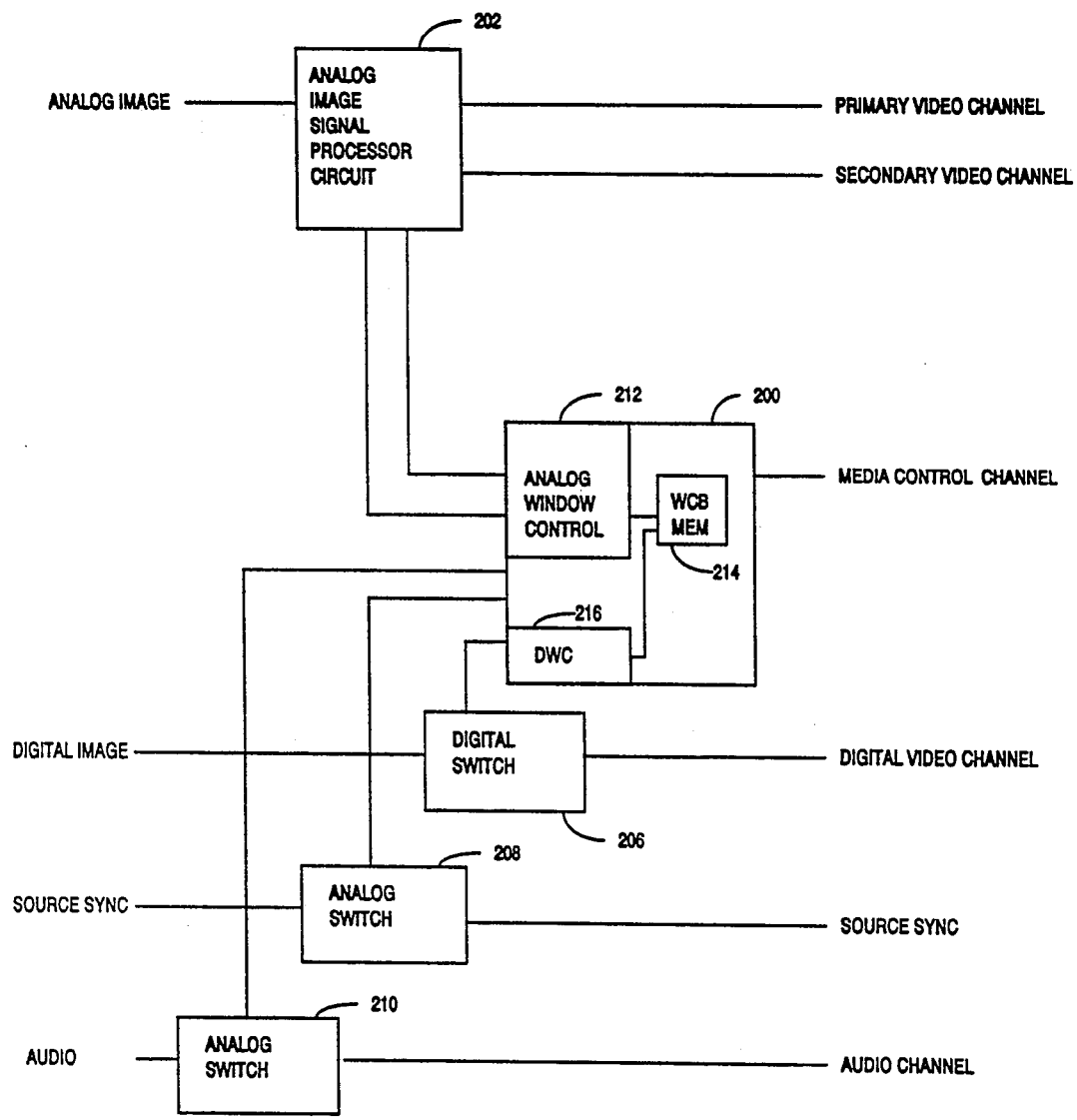
FIG. 8 is a block diagram of a bus interface circuit of the FIG. 1 multimedia system.

Referring to FIG. 8, bus interface circuit 39 for a corresponding module is shown. Interface circuit 39 includes control circuit 200 as well as analog image signal processor circuit 202, digital video switch 206, audio analog switch 208, and sync analog switch 210.

Analog image signal processor circuit 202 receives an analog image signal (ANALOG IMAGE) from a media source and switches this signal onto either the primary video channel and secondary video channel under control of control circuit 200. Digital video switch 206 receives a digital image signal (DIGITAL IMAGE) and switches this signal onto the digital video channel. Audio switch 210 receives an audio signal and switches this signal onto the audio channel. Sync analog switch 208 receives source synchronization information and switches this information onto a portion of the media control channel.

Control circuit 200 receives control information from the media control channel of media bus 24 and provides control signals to processor circuit 202 and switches 206, 208, 210. The control information includes window control block information such as the switching coordinate signals HSTART, HSTOP, VSTART and VSTOP, the 4-bit window priority signal, WP, and attribute parameter signals. The attribute parameter signals include the primary video channel enable signal, PVC EN, the secondary video channel enable signal, SVC EN, the superimpose signal, S, the full window signal, FW, the fade in signal, FIN, the fade out signal, FOUT, the 8-bit fade level signal, FLEVEL, and the fade step size signal STEP. The window control block information is stored in window control block memory 214.

Control circuit 200 controls the activation and deactivation of processor 202 and switch 206 via analog window control circuit 212 and digital window control circuit 216, respectively. Accordingly, control circuit 200 controls access to media bus 24, and thus composition of the ANALOG IMAGE signal and the DIGITAL IMAGE signal of a media source. Control circuit 200 controls the activation and deactivation of processor 202 and switch 206 based upon the switching coordinate information and the window priority information which is received from media control module 30. In a preferred embodiment, the window block information is received by control circuit 200 when a frame is initially composed. This information is stored in coordinate memory 214 of control circuit 200 until the information is updated by media control module 30. The stored information is provided to analog window control circuit 212 and digital window control circuit 216. Analog window control circuit 212 and digital window control circuit 216 include similar circuitry. However, because digital window control circuit 216 controls access to one video channel, the digital video channel, while analog window control circuit 214 control access to two video channels, the primary video channel and the secondary video channel, some circuitry of digital window control circuit 216 is duplicated for analog window control circuit 214.

Control circuit 200 also controls activation and deactivation of audio switch 210. Accordingly, control circuit 200 controls access to media bus 24 of the audio information of a particular module.

Control circuit 200 also controls activation and deactivation of analog sync switch 208 based upon synchronization control information which is provided by media control module microprocessor 62 via the media control channel. Accordingly, control circuit 200 controls access to media bus 24 of the synchronization information of a particular module. The synchronization information of the module which is granted access to media bus 24 becomes the SOURCE SYNC signal.

It is understood that a particular media source need not provide all types of media signals. For example, a media source could provide an analog image signal without providing a digital image signal or vice versa. Also, for example, a media source may provide an analog image signal without providing an audio signal. A bus interface circuit 39 for a particular media source need only be configured to allow selective access to bus 24 for the types of media signals which the particular media source provides. For example, a bus interface circuit 39 for a media source which provides an analog image signal without providing a digital image signal need not include digital switch 206 or digital window control circuit 216.

Figure 9:
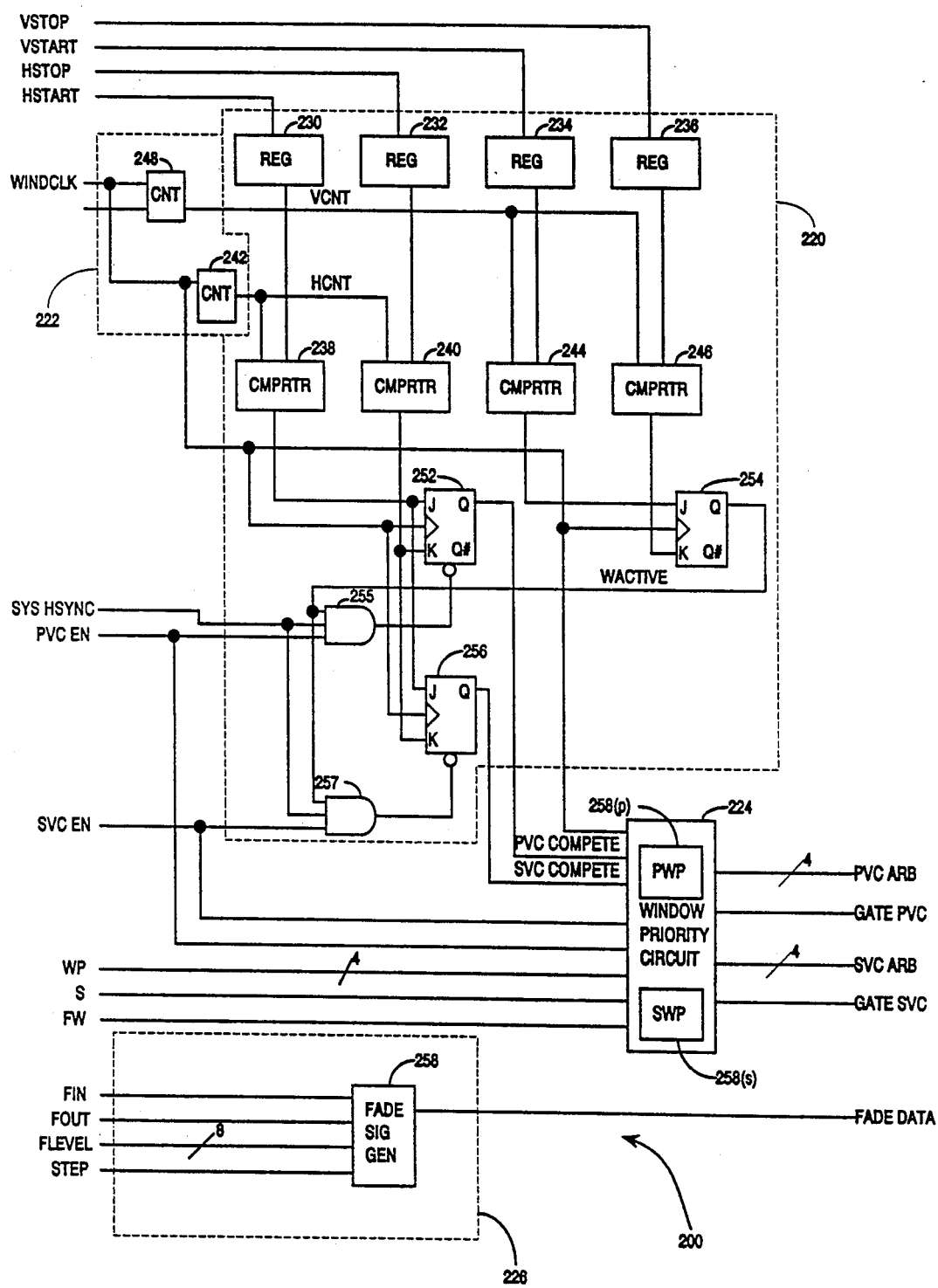
FIG. 9 is a schematic block diagram of a window control circuit of the FIG. 5 bus interface circuit.

Referring to FIG. 9, in addition to the information which is stored in window control block memory 214, analog window control circuit 212 receives the WIND CLK signal from bus 24. Analog window control circuit 212 provides the 4-bit PVC ARB signal and the 4-bit SVC ARB signal to media bus 24 as well as a primary video channel enable control signal (GATE PVC) and a secondary video channel enable control signal (GATE SVC) to analog image signal processor circuit 202.

Analog window control circuit 212 includes comparison circuit 220, timing circuit 222, window priority circuit 224 and fade circuit 226.

Comparison circuit 220 includes registers 230, 232, 234, 236 which receive the HSTART, HSTOP, VSTART and VSTOP signals, respectively. Register 230 provides a clocked HSTART signal to comparator 238. Register 232 provides a clocked HSTOP signal to comparator 240. Comparators 238 and 240 compare the HSTART and HSTOP signals to a horizontal count signal (HCNT) which is provided by counter 242 of timing circuit 222. Register 234 provides a clock VSTART signal to comparator 244 and register 236 provides a clocked VSTOP signal to comparator 246. Comparators 244 and 246 compare the VSTART and VSTOP signals to a vertical count signal (VCNT) which is provided by counter 248 of timing circuit 222.

Timing circuit 222 provides the VCNT and HCNT signals based upon the WIND CLK signal which is provided by synchronization generator circuit 58 of media control module 30. Counters 242, 248 receive the frequency synthesized WIND CLK signal from media bus 24 and provide the HCNT and VCNT signals, respectively. The HCNT and VCNT signals indicate a display coordinate of display device 14. The WIND CLK signal is also used to clock set/reset latches 252, 254 as well as window priority circuit 224.

Comparator 238 provides a horizontal set signal to the set input terminal of flip flop 252; comparator 240 provides a horizontal reset signal to the reset input terminal of flip flop latch 252. Accordingly, when comparator 238 detects a match between the HCNT signal and the HSTART signal, flip flop 252 is set. When comparator 240 detects a match between the HCNT signal and the HSTOP signal, flip flop 252 is reset. Accordingly, when flip flop 252 is set, the current display coordinate is within the horizontal window coordinates as set by the HSTART and HSTOP signals. Flip flop 252 provides a primary video channel window compete signal (PVC COMPETE) to window priority circuit 224. The PVC COMPETE signal indicates when the current display coordinate is within the window coordinates set forth by the HSTART, HSTOP, VSTART, and VSTOP signals and the primary video channel is enabled.

Comparator 244 provides a vertical set signal to the set input terminal of flip flop 254; comparator 246 provides a vertical reset signal to the reset input terminal of flip flop 254. When comparator 244 detects a match between the VCNT signal and the VSTART signal, flip flop 254 is set. When comparator 246 detects a match between the VCNT signal and the VSTOP signal, flip flop 254 is reset. Flip flop 254 provides a window active signal (WACTIVE) to AND gate 255. The WACTIVE signal indicates when the current coordinate is within the vertical coordinates defined by the VSTART and VSTOP signals.

AND gate 255 provides a primary channel enabled signal to flip flop 252. AND gate 255 also receives the HSYNC signal and the PVC EN signal. Accordingly, when the WACTIVE signal is inactive, indicating that a scan is not within the vertical start and stop coordinates, or when the PVC EN signal is inactive, indicating that the primary video channel is not enabled, flip flop 252 is reset and provides an inactive PVC COMPETE signal to window priority circuit 224. Because the HSYNC signal is provided to AND gate 255, the primary channel enabled signal may be provided to flip flop 252 on a point by point basis.

Comparator 238 also provides the horizontal set signal to the set input terminal of flip flop 256; comparator 240 also provides the horizontal reset signal to the reset input terminal of flip flop latch 256. When comparator 238 detects a match between the HCNT signal and the HSTART signal, flip flop 256 is set. When comparator 240 detects a match between the HCNT signal and the HSTOP signal, flip flop 256 is reset. Accordingly, when flip flop 252 is set, the current display coordinate is within the horizontal window coordinates as set by the HSTART and HSTOP signals. Flip flop 256 provides a secondary video channel window compete signal (SVC COMPETE) to window priority circuit 224. The SVC COMPETE signal indicates when the current display coordinate, is within the window coordinates set forth by the HSTART, HSTOP, VSTART, and VSTOP signals and the secondary video channel is enabled.

The WACTIVE signal which is generated by flip flop 254 is also provided to AND gate 257. AND gate 257 provides a secondary channel enabled signal to flip flop 252. AND gate 257 also receives the HSYNC signal and the SVC EN signal. Accordingly, when the WACTIVE signal is inactive, indicating that a scan is not within the vertical start and stop coordinates, or when the SVC EN signal is inactive, indicating that the secondary video channel is not enabled, flip flop 256 is reset and provides an inactive SVC COMPETE signal to window priority circuit 224. Because the HSYNC signal is provided to AND gate 257, the secondary channel enabled signal may be provided to flip flop 256 on a point by point basis.

Window priority circuit 224 arbitrates for access to media bus 24, controls access to media bus 24 and controls superimposition of the primary and secondary video channels. Window priority circuit 224 receives the PVC COMPETE and SVC COMPETE signals from comparison circuit 220, the WIND CLK signal, the PVC EN and SVC EN enable signals, and the PVC ARB and SVC ARB arbitration signals from bus 24 as well as the WP signal, the S signal, and the FW signal which are stored in register 257. Window priority circuit 224 includes primary window priority circuit 258(p) and secondary window priority circuit 258(s) which provide the GATE PVC signal and the GATE SVC signal, respectively. But for the signals which are received by and provided by primary and secondary window priority circuits 258(p), 258(s), these circuits are identical.

When primary window priority circuit 224(p) receives an active PVC COMPETE signal, an active PVC EN signal, and wins control of bus 24 via arbitration, then window priority circuit 224(p) generates an active GATE PVC signal which activates the primary switch of processor circuit 202, thus allowing the ANALOG IMAGE signal to be provided to the primary video channel of bus 24. When secondary window priority circuit 224(s) receives an active SVC COMPETE signal, an active SVC EN signal, and wins control of bus 24 via arbitration, then secondary window priority circuit 224(s) generates an active GATE SVC signal which activates the secondary switch of processor circuit 202 thus allowing the ANALOG IMAGE signal to be provided to the secondary video channel of bus 24.

Window control circuit 200 also includes a fade circuit 226 which controls the amplitude of the drivers of analog image signal processor circuit 202 based upon fade signals FIN, FOUT, FLEVEL and STEP. More specifically, fade signal generator circuit 258 generates a serial FADE DATA signal based upon the FLEVEL and STEP signals. The FADE DATA signal is updated each frame or multiple thereof by incrementing or decrementing fade signal generator circuit 258 from a certain amplitude level, as set forth by the FLEVEL signal, by a certain step size as set forth by the STEP signal. The update is repeated until a minimum or maximum fade level is reached. The FADE DATA signal is provided to analog image signal processor circuit 202. The FIN and FOUT signals determine whether to fade into a particular image or out of a particular image.

Figure 10:
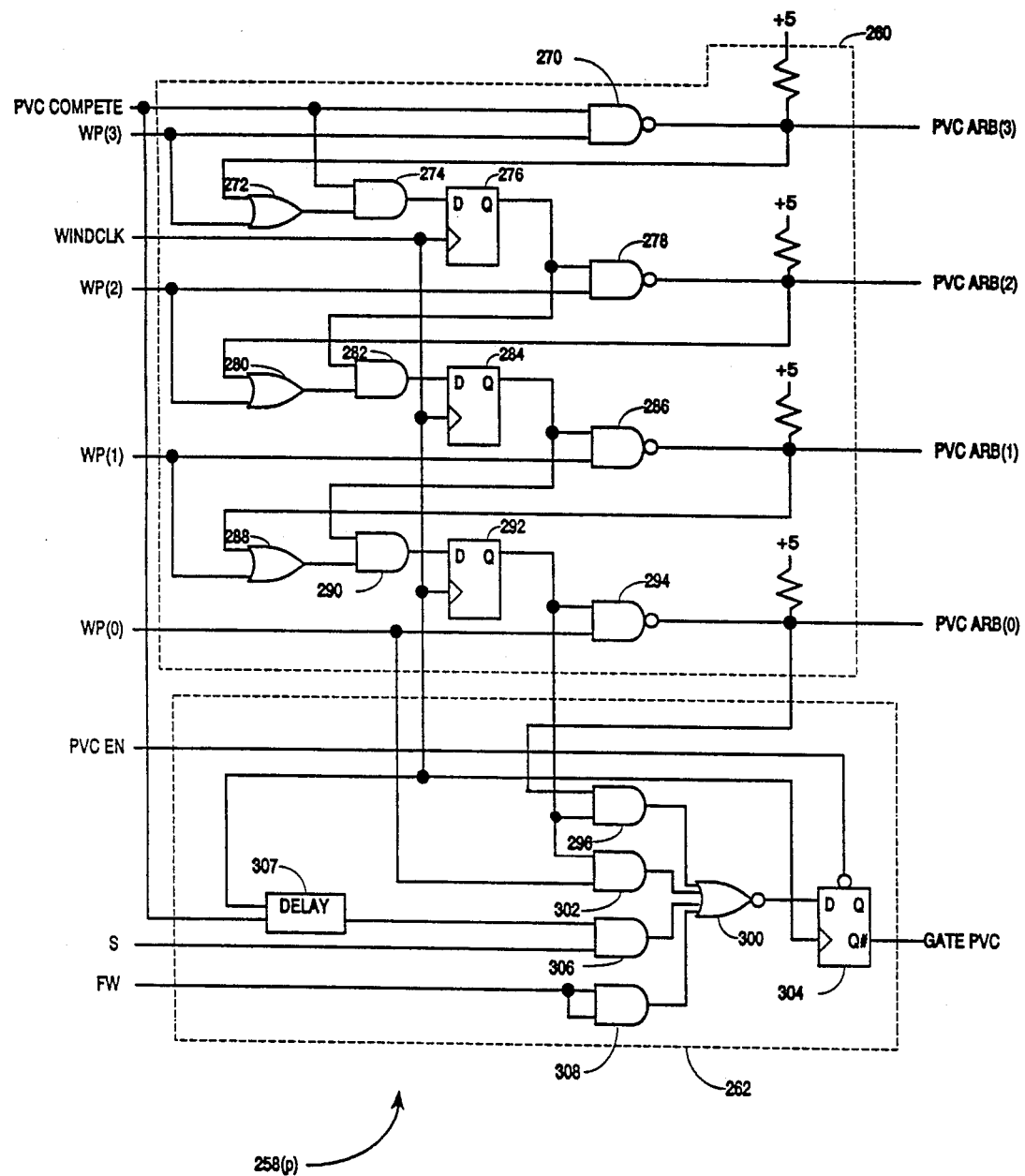
FIG. 10 is a schematic block diagram of a window priority circuit of the FIG. 7 window control module.

Referring to FIG. 10, primary window priority circuit 258(p) includes arbitration circuit 260 and source enable circuit 262. Arbitration circuit 260 receives the PVC COMPETE signal from comparison circuit 220, the 4-bit WP signal from register 225 and the 4-bit PVC ARB signal and the WIND CLK signal from bus 24 and arbitrates for control of bus 24. Source enable circuit 262 receives the S signal and the FW signal from window control block memory 214, the WIND CLK signal and the PVC EN signal from bus 24, and arbitration signals from arbitration circuit 260 and provides the GATE PVC signal.

Arbitration circuit 260 provides a four stage pipelined structure in which four points are simultaneously arbitrated. The four stage arbitration is possible because information which is provided to bus 24 is display position dependent. Accordingly, identifying the current coordinate location of information which is provided to bus 24 allows identification of future coordinate locations. All HSTART and HSTOP window switching coordinates are thus set four coordinates ahead of the desired display coordinate under software control by media control module 30.

During composition of a frame, arbitration begins four cycles before the coordinate location for which the arbitration is being performed. During arbitration for a particular coordinate location, the PVC COMPETE signal corresponding to that location is provided to arbitration circuit 260. This PVC COMPETE signal is pipelined through arbitration circuit 260 so that when display device 14 is at the corresponding coordinate location, a signal which is derived from the PVC COMPETE signal contributes to the generation of the GATE signal.

More specifically, during arbitration for the first coordinate location, the PVC COMPETE signal corresponding to the first coordinate location and the most significant bit of the WP signal, WP(3) (a number in parentheticals indicates a corresponding bit of a multibit signal), are provided to NAND gate 270. If both the PVC COMPETE signal and the WP(3) signal are active, then NAND gate 270 drives the ARB(3) signal active. If either the PVC COMPETE signal or the WP(3) signal are inactive then NAND gate 270 does not drive the ARB(3) signal active. The ARB(3) signal may also be driven active by any other media source which is arbitrating for bus 24.

The WP(3) bit and the ARB(3) bit are provided to OR gate 272, which provides a more significant arbitration bit indication signal to AND gate 274. AND gate 274 also receives the PVC COMPETE signal. AND gate 274 provides a compete indication signal to D flip flop 276 which provides a pipelined compete signal (PVC COMPETE2) to NAND gate 278. Flip flop 276 is clocked by the WIND CLK signal. NAND gate 278 also receives the WP(2) bit. If both the PVC COMPETE2 signal and the WP(2) bit are active, then NAND gate 278 drives the ARB(2) bit active. If either the PVC COMPETE2 signal or the WP(2) bit are inactive then NAND gate 278 does not drive the ARB(2) bit active. The ARB(2) bit may also be driven active by any other media source which is arbitrating for bus 24.

The WP(2) bit and the ARB(2) bit are provided to OR gate 280, which provides a more significant arbitration bit indication signal to AND gate 282. AND gate 282 also receives the PVC COMPETE2 signal. AND gate 282 provides a compete indication signal to D flip flop 284 which provides a pipelined compete signal (PVC COMPETE3) to NAND gate 286. Flip flop 284 is clocked by the WIND CLK signal. NAND gate 286 also receives the WP(1) bit. If both the PVC COMPETE3 signal and the WP(1) bit are active, then NAND gate 286 drives the ARB(1) bit active. If either the PVC COMPETE3 signal or the WP(1) bit are inactive then NAND gate 286 does not drive the ARB(1) bit active. The ARB(1) bit may also be driven active by any other media source which is arbitrating for bus 24.

The WP(1) bit and the ARB(1) bit are provided to OR gate 288, which provides a more significant arbitration bit indication signal to AND gate 290. AND gate 290 also receives the PVC COMPETE3 signal. AND gate 290 provides a compete indication signal to D flip flop 292 which provides a pipelined compete signal (PVC COMPETE4) to NAND gate 294. Flip flop 290 is clocked by the WIND CLK signal. NAND gate 294 also receives the WP(0) bit. If both the PVC COMPETE4 signal and the WP(0) bit are active, then NAND gate 294 drives the ARB(0) bit active. If either the PVC COMPETE4 signal or the WP(0) bit are inactive then NAND gate 294 does not drive the ARB(0) bit active. The ARB(0) bit may also be driven active by any other media source which is arbitrating for bus 24.

The ARB(0) bit is provided to AND gate 296 which also receives the PVC COMPETE4 signal. AND gate 296 provides an arbitration bit indication signal to NOR gate 300. If the PVC COMPETE4 signal is active and the ARB(0) bit is inactive, then AND gate 296 provides an active arbitration bit indication signal to NOR gate 300. If NOR gate 300 receives an active arbitration bit indication signal, then it provides an active gate signal to flip flop 304. If either the PVC COMPETE4 signal is inactive or the ARB(0) bit is active then AND gate 296 provides an inactive arbitration bit indication signal to NOR gate 300.

The WP(0) bit is provided to AND gate 302 which also receives the PVC COMPETE4 signal. AND gate 302 provides a window priority bit indication signal to NOR gate 300. If the WP(0) signal is active and the PVC COMPETE4 bit is active, then AND gate 302 provides an active window priority bit indication signal to NOR gate 300. If NOR gate 300 receives an active window priority bit indication signal, then it provides an active gate signal to flip flop 304. If either the WP(0) signal is inactive or the PVC COMPETE4 bit is inactive then AND gate 296 provides an inactive window priority bit indication signal to NOR gate 300.

NOR gate 300 provides an unclocked gate signal to D flip flop 304 which is clocked by the WIND CLK signal. Flip flop 304 is controlled by the PVC EN signal which is provided to the set input terminal of flip flop 304. Accordingly, if the PVC EN signal is active, then flip flop 304 passes the unclocked gate signal at the next rising edge of the WIND CLK signal to provide the GATE PVC signal. If the PVC EN signal is inactive then the GATE PVC signal remains inactive.

AND gate 306, which receives the S signal as well as a PVC COMPETE signal which is delayed three WIND CLK signal clock cycles by delay circuit 307, provides an active superimpose enabled signal to NOR gate 300 when the S signal is active and the PVC COMPETE signal is active. An active superimpose enabled signal causes NOR gate 300 to provide an active gate signal to flip flop 304.

AND gate 308, which receives the FW signal, provides an active full window enabled signal to NOR gate 300 when the FW signal is active. An active full window enabled signal causes NOR gate 300 to provide an active gate signal to flip flop 304.

Figure 11A:
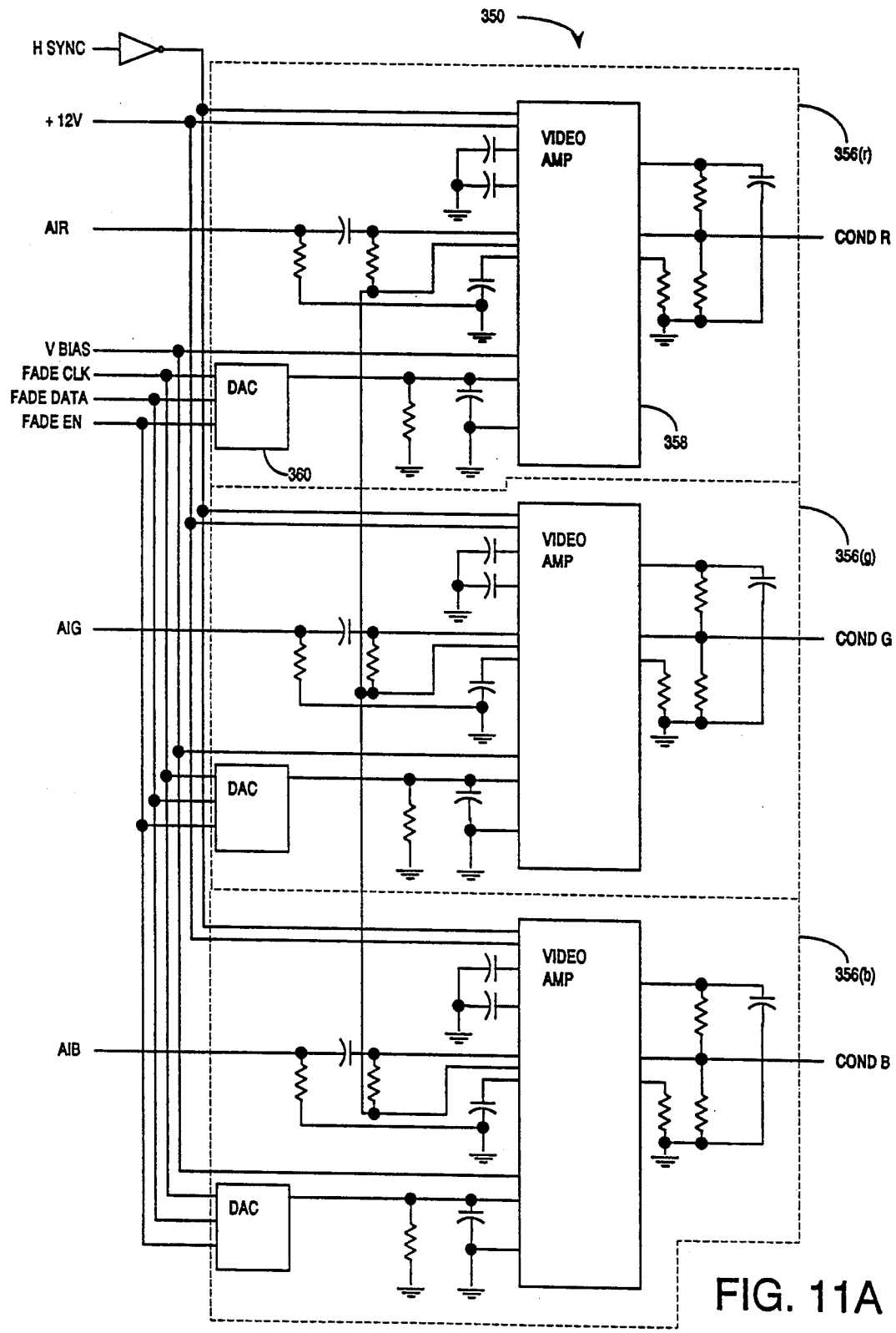
FIGS. 11A and 11B are a schematic block diagram of a receiver/switch circuit of the FIG. 8 bus interface circuit.
Figure 11B:
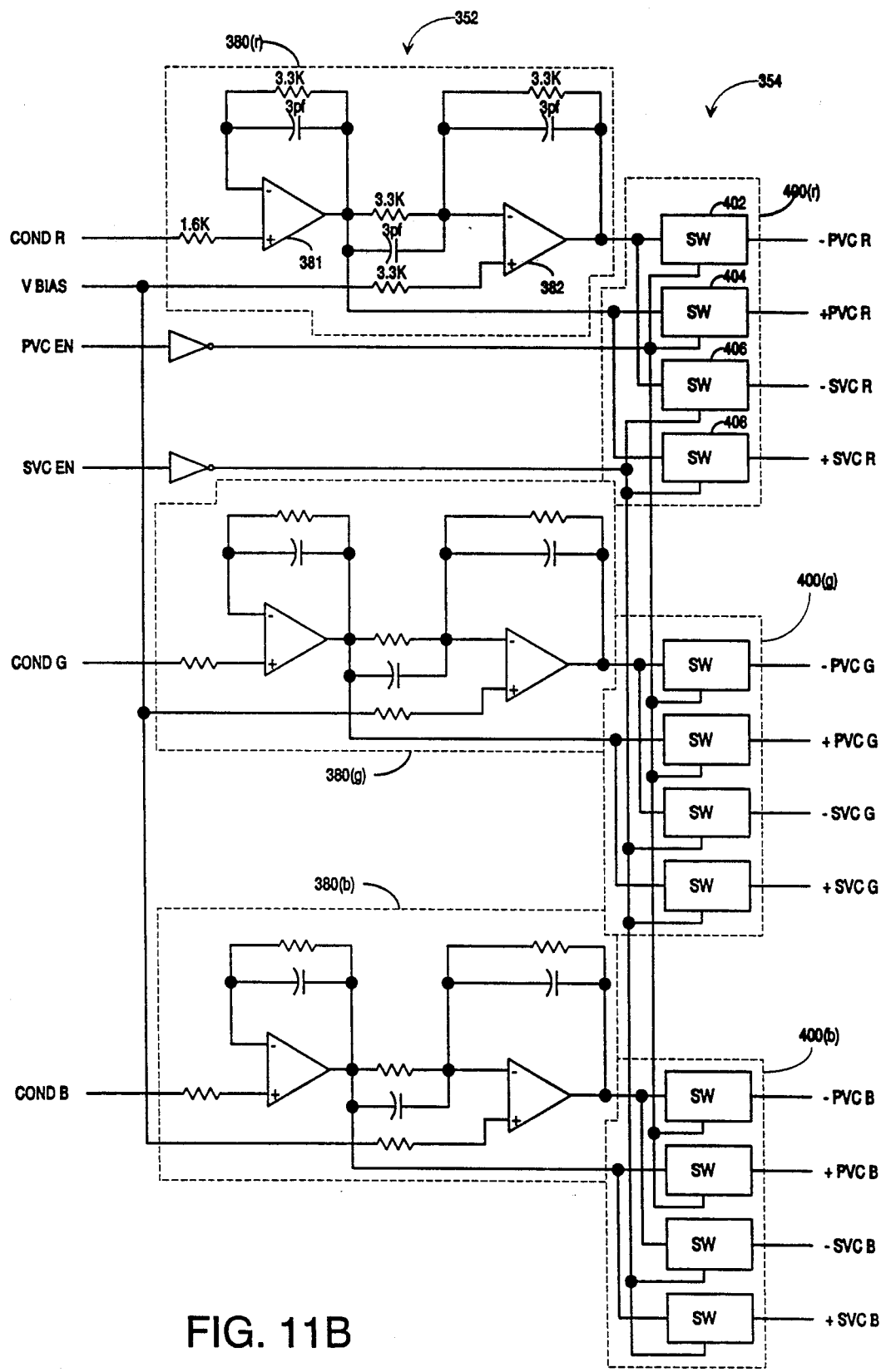

Referring to FIGS. 11A and 11B, analog image signal processor circuit 202 is shown. Analog image signal processor circuit 202 receives the red, green and blue components of the ANALOG IMAGE signal as well as the FADE CLK, FADE DATA and FADE EN fade signals and the HSYNC signal and provides the differentially driven PVC RGB and SVC RGB signals. Analog image signal processor circuit 202 includes analog image signal conditioner circuit 350, driver circuit 352 and switch circuit 354.

Analog image signal conditioner circuit 350 includes red component conditioner circuit 356(r), green component conditioner circuit 356(g), and blue component conditioner circuit 356(b). These circuits are similar and are generally referred to as component conditioner circuit 356. Each component conditioner circuit 356 includes video amplifier circuit 358 (e.g., a LM 1201 available from National Semiconductor, Inc.) as well as three-input serial digital to analog converter (DAC) 360 (e.g., a MC144111 available from Motorola Corp.).

Video amplifier circuit 358 receives a component of the ANALOG IMAGE signal, conditions this component and provides a conditioned component signal to driver circuit 352. (E.g., video amplifier circuit 358 of red component conditioner circuit 356(r) provides a COND R signal.) The conditions which video amplifier circuit 358 control include the black level of the component and the fade/gain level of the component.

The black level of the component is based upon the V BIAS signal which is provided by bias generator circuit 117 of media control module 30. This is the same V BIAS signal which sets the black level of media control module 30. Because bus interface circuit 39 uses the same reference signal as media control module 30, a standard black level is produced regardless of which media source provides its image signal to bus 24.

The fade level of the component is based upon a voltage level which is provided by DAC 360 to video amplifier circuit 358. DAC 360 receives the FADE CLK signal, the FADE DATA signal and the FADE EN signal and provides a voltage indicative of fade level to video amplifier circuit 358.

Driver circuit 352 includes red component driver circuit 380(r), green component driver circuit 380(g) and blue component driver circuit 380(b). These components are similar and are generally referred to as component driver circuit 380. Each component driver circuit 380 includes operational amplifiers 381, 382 which are configured as a unity gain differential driver. Operational amplifier 381 is configured as a non-inverting voltage follower and operational amplifier 382 is configured as an inverting voltage amplifier. Accordingly, component driver circuit 380 receives a single ended unbalanced conditioned component signal (e.g., COND R) and generates a balanced differential component signal.

Switch circuit 354 includes red component switch circuit 400(r), green component switch circuit 400(g) and blue component switch circuit 400(b). These components are similar and are generally referred to as component switch circuit 400. Each component switch 400 includes four analog switches (e.g., TLC 4066I available from Texas Instruments, Inc.). The four analog switches are arranged as primary channel negative switch 402, primary channel positive switch 404, secondary channel negative switch 406 and secondary channel positive switch 408. Primary channel negative and positive switches 402, 404 are controlled by the inverse of the PVC EN signal, which is part of the control information provided by media control module 30. Secondary channel negative and positive switches 406, 408 are controlled by the inverse of the SVC EN signal which is part of the control information provided by media control module 30.

Other Embodiments

Other embodiments are within the following claims.

For example, the control information which controls the switching of bus interface circuits 39 may be provided by processor module 36 rather than media control module 30.

Also for example, the switching coordinates may be provided on a point by point basis rather than only when the composition of a frame changes. By providing the switching coordinates on a point by point basis, the need for memory in bus interface circuit 39 is avoided.

Also for example, media core 12 can be configured to provide a monochrome presentation rather than a color presentation. In such a configuration, the signal paths of media bus 24 need only have a single component path rather than component paths for the red, green and blue components of the image signal. Additionally, the drivers and receivers of media core 12 need only handle the single component. Alternately, a monochrome presentation may be presented via the preferred embodiment of the multimedia system by providing the monochrome image signal equally over each of the component paths of media bus 24.

Also for example, multimedia system 10 may be configured to function using color characterizations other than RGB. For example, multimedia system 10 may function using a Hue, Saturation, Intensity (HSI) characterization of a presentation.

We claim:

1. A bus apparatus for transferring and composing image signals for display comprising:
   a control channel,
      said control channel being adapted to transmit control information, and
   a video channel,
      a plurality of independent image signals,
      said plurality of image signals being continuously generated by a respective plurality of independent image sources, said image signals being analog image signals, and each independent image signal representing a virtual screen of information,
      said analog image signals being adapted to selectively access said video channel one at a time, said selective access performed by interface circuits which are directly coupled to said plurality of independent image sources and said video channel,
      said selective access enabling composition of said independent image signals into a composed image signal representing an image to be displayed in response to the control information,
      said composition enabling real time display of said composed image signal.

2. The apparatus of claim 1 wherein
   said composition includes generating said composed image signal on a point by point basis.

3. The apparatus of claim 1 wherein some of said image signals include analog image signals, and said video channel provides a path for said analog image signals.

4. The apparatus of claim 3 wherein
   said analog image signals are differential analog image signals, and
   said path for said analog image signals is a differential path for said differential analog image signal.

5. The apparatus of claim 4 wherein
   each analog image signal includes color characteristic signals, and
   said path for said analog image signals includes paths for said color characteristic signals.

6. The apparatus of claim 5 wherein
   said color characteristic signals include red, green, and blue characteristic signals, and
   said paths for said color characteristic signals include paths for said red, green and blue characteristic signals.

7. The apparatus of claim 1 wherein
   said image signals include respective synchronization information, and
   said video channel includes a path for said synchronization information.

8. The apparatus of claim 7 wherein
   said synchronization information includes vertical synchronization information and horizontal synchronization information, and
   said path for said synchronization information includes paths for said vertical synchronization information and said horizontal synchronization information.

9. The apparatus of claim 1 wherein
said image signals include respective color key match information, and
said video channel includes a path for said color key match information.

10. The apparatus of claim 1 further comprising
a second video channel, and wherein
said independent image signals selectively access said second video channel in response to control information.

11. The apparatus of claim 1 further comprising
a digital video channel, and wherein
some of said independent image signals are digital image signals, and
said digital image signals selectively access said digital video channel of said bus in response to control information.

12. The apparatus of claim 1 wherein
said control information includes switch information,
said switch information indicates when to switch from one said image signal to another said image signal.

13. The apparatus of claim 12 wherein
said switch information includes horizontal information and vertical information for each image signal.

14. The apparatus of claim 12 wherein
said control information includes priority information for each image signal.

15. A multimedia bus for transferring and composing a plurality of analog image signals provided by a respective plurality of independent image sources, the bus allowing the plurality of image signals to be presented by a single display device, the bus comprising:
a control channel adapted to transmit control information, and
a video channel adapted to transmit analog image signals,
the analog image signals being adapted to selectively access said video channel one at a time,
said selective access performed by interface circuits which are directly coupled to said plurality of independent image sources and said video channel, each independent image signal representing a virtual screen of information,
said selective access enabling composition of said independent image signals into a composed image signal representing an image to be displayed in response to the control information,
said composition enabling real time display of a composed image signal by the display device.

16. The apparatus of claim 15 wherein
said composition includes generating said composed image signal on a point by point basis.

* * * * *